United States Patent
Kawasaki et al.

(10) Patent No.: US 7,269,035 B2
(45) Date of Patent: Sep. 11, 2007

(54) SWITCHING DEVICE AND RELATED OPERATING METHOD

(75) Inventors: Koji Kawasaki, Anjo (JP); Keiji Shigeoka, Okazaki (JP); Shinya Goto, Gifu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 2 days.

(21) Appl. No.: 11/395,154

(22) Filed: Apr. 3, 2006

(65) Prior Publication Data
US 2006/0221654 A1 Oct. 5, 2006

(30) Foreign Application Priority Data
Apr. 1, 2005 (JP) .............................. 2005-105842

(51) Int. Cl.
*H02M 1/12* (2006.01)
*H02M 3/335* (2006.01)
(52) U.S. Cl. ....................................... 363/41; 455/298
(58) Field of Classification Search ............. 363/21.01, 363/21.04, 21.1, 21.12, 21.18, 39, 40, 41, 363/97, 98, 131, 132; 455/297, 298
See application file for complete search history.

(56) References Cited

U.S. PATENT DOCUMENTS

| | | | |
|---|---|---|---|
| 5,068,777 A * | 11/1991 | Ito | ............................... 363/97 |
| 5,488,627 A | 1/1996 | Hardin et al. | |
| 5,519,889 A * | 5/1996 | Hipp | ........................... 455/297 |
| 6,043,996 A * | 3/2000 | Kumar | ........................ 363/41 |
| 6,549,429 B2 | 4/2003 | Konno | |
| 2003/0026116 A1 | 2/2003 | Ueki et al. | |

FOREIGN PATENT DOCUMENTS

| | | |
|---|---|---|
| JP | A 2001-218461 | 8/2001 |
| JP | A 2002-355672 | 11/2002 |
| JP | A 2003-079134 | 3/2003 |
| JP | A 2003-079135 | 3/2003 |
| JP | A 2003-088101 | 3/2003 |

OTHER PUBLICATIONS

U.S. Appl. No. 11/319,062, filed Dec. 28, 2005, Goto et al.

* cited by examiner

*Primary Examiner*—Gary L Laxton
(74) *Attorney, Agent, or Firm*—Oliff & Berridge, PLC

(57) ABSTRACT

A switching device and a method of operating a switching power element are disclosed for generating a train of drive pulses (D1 to D32) in a basic pattern for a repetition cycle time (T to TF) having leading time intervals (Th1 to Th3, Th1' to Th3'), associated with leading edges (a1 to a32) of the drive pulses, and trailing time intervals (Tl1 to Tl3, Tl1' to Tl3'), associated with trailing edges (b1 to b32) of the drive pulses, which are different from each other, whereby switching frequencies and associated harmonics, resulting from the leading edges and the trailing edges of the drive pulses, are diffused. A diffusion frequency, representing an inverse number of the repetition cycle time for the basic pattern is set to be higher than an audible frequency.

19 Claims, 16 Drawing Sheets

FREQUENCY (Hz)

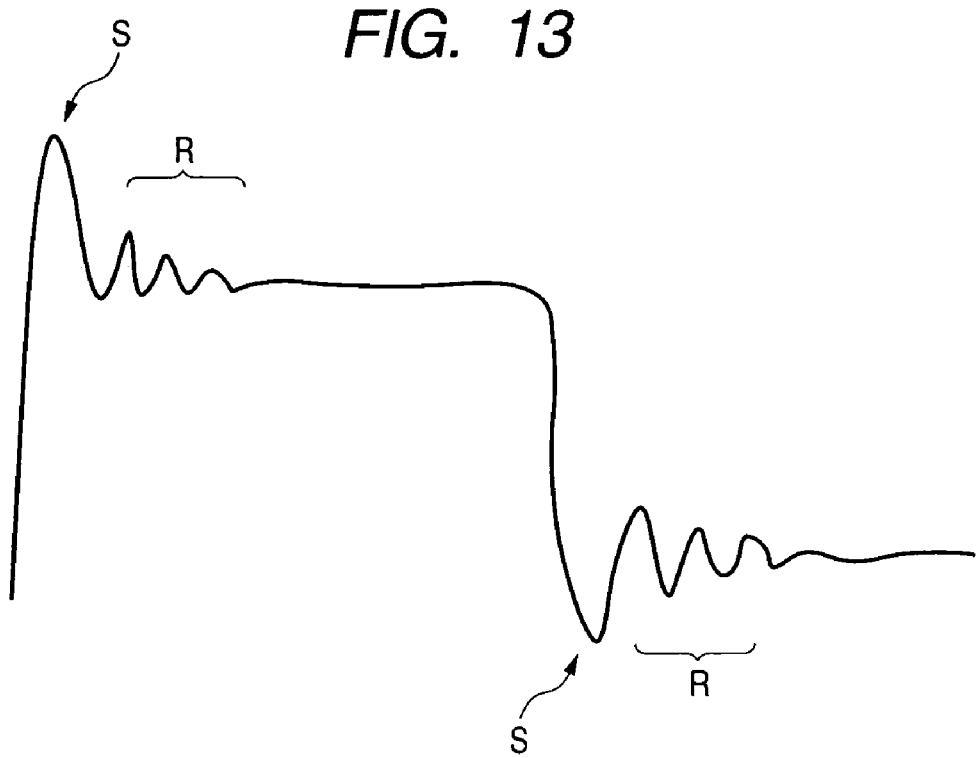
FIG. 13
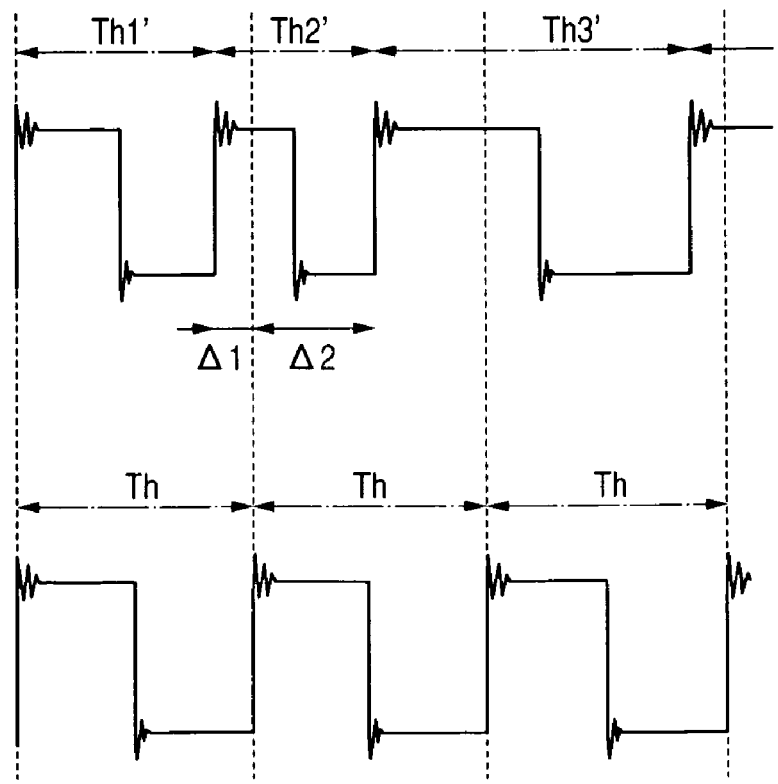
FIG. 14A
FIG. 14B (PRIOR ART)

| PATTERN<br>DUTY | BASIC<br>PATTERN 1 | BASIC<br>PATTERN 2 | ... | BASIC<br>PATTERN N |
|---|---|---|---|---|
| 1% | ○ | ◌ | | ◌ |
| 2% | ○ | × | | ◌ |
| ⋮ | | | | |
| 50% | × | ○ | | × |
| 51% | ◌ | ○ | | × |
| ⋮ | | | | |
| 99% | ◌ | ◌ | | ○ |

FIG. 17A
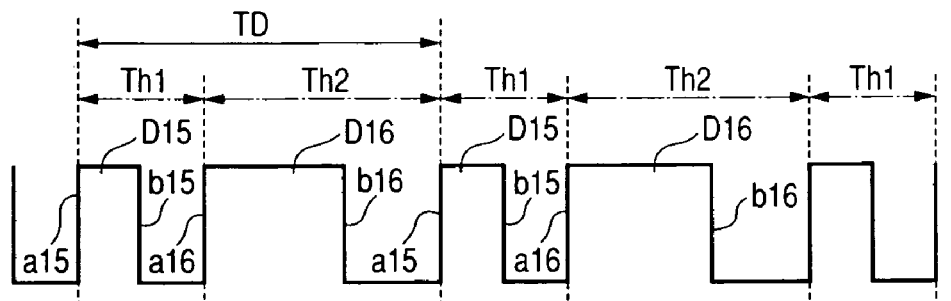
FIG. 17B
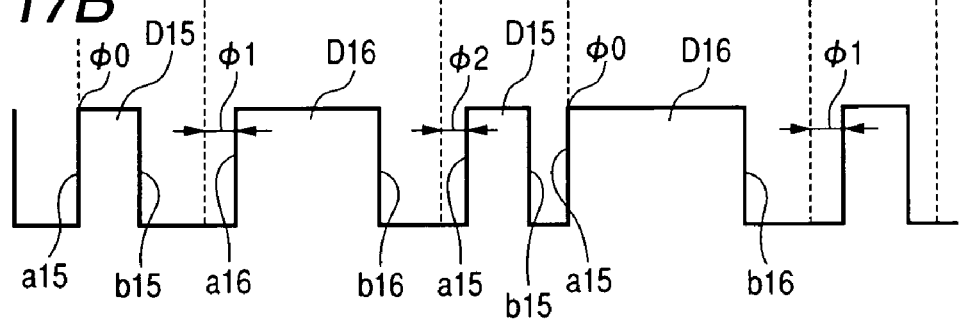
FIG. 18
| BASIC FREQ. \ HARMONICS | X2 | X3 | X4 | X5 | X6 |
|---|---|---|---|---|---|
| 50kHz | 100 | 150 | 200 | 250 | 300 |
| 47kHz | 94 | 141 | 188 | 235 | 282 |
| 60kHz | 120 | 180 | 240 | 300 | 360 |
| 53kHz | 106 | 159 | 164 | 217 | 270 |
DIFFUSION FREQUENCY ≒13kHz

FIG. 19A
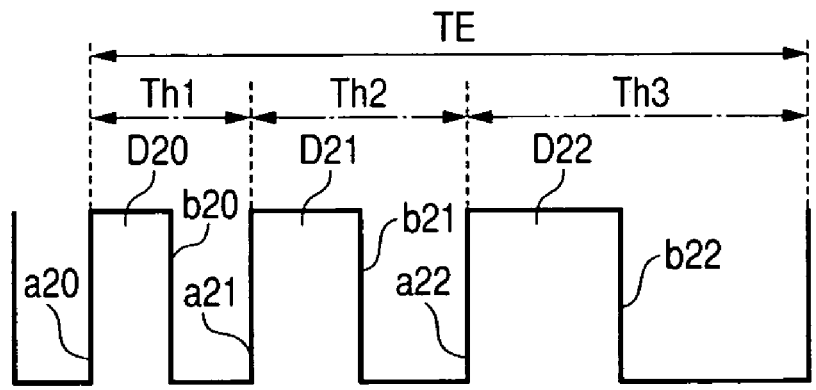
FIG. 19B
| fh1 | 2Xfh1 | 3Xfh1 | 4Xfh1 | 5Xfh1 | · · · · · |
| fh2 | 2Xfh2 | 3Xfh2 | 4Xfh2 | 5Xfh2 | · · · · · |
| fh3 | 2Xfh3 | 3Xfh3 | 4Xfh3 | 5Xfh3 | · · · · · |
FIG. 19C
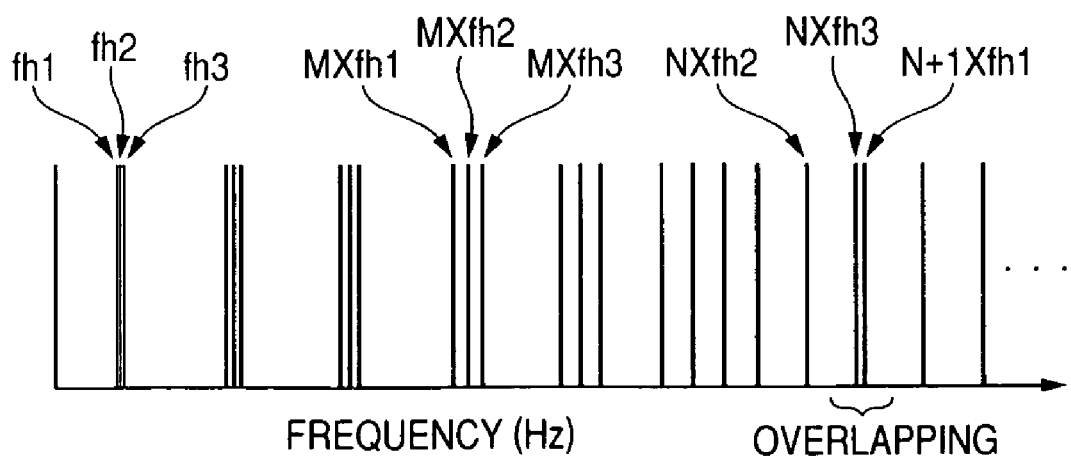

SWITCHING DEVICE AND RELATED OPERATING METHOD

CROSS REFERENCE TO RELATED APPLICATIONS

This application is related to Japanese Patent Application No. 2005-105842 filed on Apr. 1, 2005, the content of which is hereby incorporated by reference.

FIELD OF THE INVENTION

The present invention relates to switching devices for operating switching power elements and related operation methods and, more particularly, to a switching device and related operation method for performing switching control so as to suppress switching noises occurring during operations of a switching power element.

DESCRIPTION OF THE RELATED ART

Switching device of this type includes a switching device that is used in an onboard power electronics device installed on, for instance, a vehicle. With the vehicle installed with such an onboard power electronics device, noises occur during operations of the switching device and overlap a frequency of a broadcast station selected by an on-vehicle radio receiver. With the frequency of the selected broadcast station overlapped with noises, a speaker of a car audio unit outputs an audible frequency (sound) to which noises are mixed, giving a user an uncomfortable feeling.

Technologies have been well known in the art wherein in order to suppress such noises, a spectrum diffusion scheme is employed to diffuse energies of harmonic components of a switching frequency with a view to eliminating an energy level of average noise. However, although such a technology makes it possible to reduce the energy of the noise caused by the respective switching frequencies and associated harmonics, difficulties are encountered in the related art in which when the switching frequencies and associated harmonics are overlapped with the frequency of the broadcast station, the speaker outputs noise in an uncomfortable fashion.

Further, although a noise filter is conceivably provided on the switching device at an output side thereof to achieve reduction in noise outputted from the speaker, the noise filter becomes complex in structure and large in size in order to adequately suppress noise from the speaker.

To address such an issue, attempts have heretofore been made to provide a switching device arranged to set a switching frequency of a switching power element such that harmonics of the switching frequency have a given relationship with a frequency band of a selected broadcast station as disclosed in Japanese Patent Laid-Open Publications No. 2002-335672 and No. 2003-88101. That is, with such a switching device, a train of drive pulses is generated such that the switching frequency is set to a specified frequency different from the selected broadcast station to avoid a speaker from outputting noise.

However, due to piece-to-piece variations of component parts forming the switching device, the switching frequency is liable to vary with the resultant difficulty in setting the switching frequency with a given relationship maintained with respect to the frequency band of the selected broadcast station. Also, in general practice, an AM broadcast station has one station with a frequency band (bandwidth) in a range of "9 kHz" in Japan and "10 kHz" in USA. Thus, it seems distant for the switching frequency to be set in the given relationship within such narrow frequency bands.

SUMMARY OF THE INVENTION

The present invention has been completed with the above issues in mind and has an object to provide a switching device and related operation method for performing switching control in a mode to appropriately suppress the occurrence of disturbance on communication of audible information caused by noise resulting from switching control.

To achieve the above object, one aspect of the present invention provides a switching device for repeatedly turning a switching power element on and off, comprising a memory storing a basic pattern, a drive pulse generator configured to generate a train of drive pulses under the basic pattern, stored in the memory, for a repetition cycle time having leading time intervals, associated with leading edges of the drive pulses, and trailing time intervals associated with trailing edges of the drive pulses, with at least one of the leading time intervals and the trailing time intervals being different from each other. An inverse number of the repetition cycle time is kept away from an audible band under a condition where switching frequencies, resulting from at least one of the leading time intervals and the trailing time intervals, and associated harmonics intermittently overlap a given frequency for which the switching device needs to undertake a measure for noise suppression.

With such a structure mentioned above, the switching power element is turned on and off at diffused timings caused by the leading time intervals and trailing time intervals different from each other in the basic pattern. Thus, switching frequencies and associated harmonics can be diffused in wide range of frequencies and do not overlap each other, causing reduction in average noise to a lower energy level than those occurring when the switching power element is operated at fixed time intervals as practiced in the state-of-the art.

However, even if the average energy level of noises is reduced, the switching frequencies and associated harmonics are probable to overlap the given frequency, In such a case, noises may be possibly mixed to a signal (voice signal) having audible information at the given frequency. In this respect, the inverse number of the repetition cycle time of the train of drive pulses are set to be away from the audible frequency band. Therefore, even if the given frequency is overlapped with the switching frequencies and associated harmonics to cause the occurrence of noises, no noise output from a speaker on a final stage falls in the audible frequency band. This satisfactorily suppresses noises from disturbing audible information in communication.

The drive pulse generator may comprise frequency diffuser means arranged to store the basic pattern, under which the repetition cycle time has the leading time intervals and the trailing time intervals that are different from each other, such that switching frequencies, resulting from the leading time intervals and the trailing time intervals, and associated harmonics are diffused. A diffusion frequency, representing a repetition cycle of the basic pattern, is set to be higher than the audible frequency band.

With such a structure, the switching power element can be operated oh a repetition mode with the basic pattern including the leading time intervals and trailing time intervals different from each other. This allows the switching frequencies and associated harmonics, resulting from the leading time intervals and trailing time intervals of the drive pulses, to be diffused at various timings in contrast to those of the related art practice, enabling reduction in average energy level of noises resulting form switching control.

With the above structure, further, the diffusion frequency, representing the inverse number of repetition cycle time of the basic pattern is set to be higher than the audible frequency. This reliably precludes the inverse number of the repetition cycle time from falling in the audible frequency even under circumstances where the switching frequencies and associated harmonics, resulting from the leading time intervals and trailing time intervals of the drive pulses, overlap the given frequency in a discontinuous fashion.

The basic pattern may be set such that at least one of the leading time intervals and the trailing time intervals are entirely different from each other.

With the above structure, since at least one of the leading time intervals and the trailing time intervals are entirely different from each other, the switching frequencies and associated harmonics resulting from these different time intervals can be diffused in a further favorable fashion.

The basic pattern may be set such that the associated harmonics of the switching frequencies do not overlap each other in a frequency band for which the switching device needs to undertake a measure for noise suppression.

With such a structure, the associated harmonics of the switching frequencies do not overlap each other in the frequency band for which the switching device needs to undertake a measure for noise suppression. Therefore, even if the given frequency and a particular harmonic overlap each other, the presence of only one particular harmonic enables reduction in energy level of noise to be overlapped with the given frequency. In addition, with the basic pattern being set in such away, all the associated harmonics of the switching frequencies can be avoided from overlapping the given frequency. Thus, even when the associated harmonics of the switching frequencies overlap the given frequency, the overlapping can be made discontinuous in a reliable manner.

Also, the frequency band mentioned above may be equal to the given frequency or include a frequency band involving such a given frequency.

The memory stores the basic pattern composed of a plurality of patterns under which the leading time intervals and the trailing time intervals are different from each other, and duty control means operative to perform duty control upon selecting one of the plurality of patterns to allow the drive pulses to have duty cycles, respectively, under which the switching frequencies, resulting from the leading time intervals and the trailing time intervals, do not overlap each other in the audible frequency band.

With such a structure mentioned above, the basic pattern includes the plural patterns under which the leading time intervals and the trailing time intervals are different from each other. With the duty cycles of the drive pulses being variably set, depending on the duty cycles of the drive pulses, probabilities occur wherein the switching frequencies, resulting from the trailing time intervals of the drive pulses determined in the basic pattern, overlap each other in the audible frequency band with the resultant increase in energy level of noises. In contrast to such issue, with the structure mentioned above, since the basic pattern includes the plurality of patterns that can be selected to allow the drive pulses to have duty cycles under which the switching frequencies, resulting from the trailing time intervals of the drive pulses, do not overlap each other in the audible frequency band. This results in successfully avoiding an increase in energy level of noises during duty control.

The memory may store the duty cycles of the drive pulses, respectively, with which the switching frequencies, resulting from the leading time intervals and the trailing time intervals, and associated harmonics do not overlap each other, and the duty control means being operative to perform the duty control using the duty cycles stored in the memory.

Due to the memory storing the duty cycles of the drive pulses by which the switching frequencies, resulting from the leading time intervals and the trailing time intervals, do not overlap each other, the duty control means can easily perform duty control without causing the switching frequencies, resulting from the leading time intervals and the trailing time intervals, and associated harmonics to overlap each other.

The memory may store the basic pattern including a plurality of patterns such that the drive pulses in one of the plural patterns and the drive pulses in the other one of the plural patterns have different duties, and the duty control means selects one of the plurality of patterns depending on a required duty.

With duty control being performed using the train of drive pulses with the leading time intervals and the trailing time intervals determined in the basic pattern, the switching frequencies, resulting from the time intervals, possibly overlap each other. With the structure mentioned above, one of the plural patterns of the basic pattern is selected depending on the required duty. Additionally, under circumstances where the required duty is set using the train of drive pulses determined under one of the plural patterns and the switching frequencies, resulting from the time intervals of the drive pulses determined in the one of the plural patterns, overlap each other, the other one of the plural patterns forming the basic pattern is selected. This avoids the switching frequencies from overlapping each other. Moreover, the required duty can be obtained while satisfactorily avoiding the switching frequencies, resulting from the time intervals of the drive pulses, from overlapping each other.

The memory may store the duty control means performs the duty control so as to provide an average duty satisfying a required duty for the repetition cycle time upon selecting the different duties.

Under situations where duty is variably controlled with the leading time intervals and the trailing time intervals of the drive pulses for the repetition cycle with a view to providing the required duty, the switching frequencies, caused by the time intervals of the drive pulses, possibly overlap each other. But, the structure mentioned above address such an issue upon selecting one of the different duties provided by the time intervals in the plural patterns of the basic pattern. This results in the avoidance of the occurrence of the duty under which the switching frequencies, caused by the time intervals of the drive pulses, overlap each other. Moreover, with the drive pulses determined in the plural patterns to provide the average duty in conformity to the required duty, the switching device can provide the required duty without causing the switching frequencies, caused by the time intervals of the drive pulses, to overlap each other.

The duty control means may perform the duty control such that the associated harmonics of the switching frequencies, resulting from the leading time intervals and the trailing time intervals of the drive pulses, do not overlap each other in a frequency band for which the switching device needs to undertake a measure for noise suppression.

With such a structure described above, variable control is performed on the duty of the repetition cycle time so as to preclude the harmonics of the switching frequencies from overlapping each other in the frequency band mentioned above. This results in avoidance of an increase in energy level of noises in frequencies resulting from the overlapping between the harmonics.

Also, the frequency band may be set to be equal to the given frequency set forth above and include a frequency band involving such a given frequency.

The given frequency may include a frequency falling in a frequency band of a radio broadcast and an expression "to overlap the given frequency" refers to a status wherein a frequency difference with respect to the given frequency falls in a bandwidth for one broadcast station of the radio broadcast.

Various broadcast stations of the radio broadcast include given frequency bands (bandwidths). In this respect, by defining the overlapping status with the use of the bandwidth for one broadcast station, the switching device can be configured to appropriately address the issue of noises conflicting with frequencies from the various broadcast stations.

The given frequency, for which the switching device needs to undertake the measure for noise suppression, includes a frequency band of a radio broadcast and an expression "to overlap the given frequency" refers to a status wherein a frequency difference with respect to the given frequency falls in a bandwidth for one broadcast station of the radio broadcast.

Various broadcast stations of the radio broadcast include given frequency bands (bandwidths). In this respect, by defining the overlapping status with the use of the bandwidth for one broadcast station, the switching device can be configured to appropriately address the issue of noises conflicting the frequencies of the various broadcast stations.

The frequency diffuser means is operative to shift the leading time intervals of the drive pulses by given shift amounts, respectively.

During switching control of the switching power element, the switching power element generally operates accompanied by surge noises. Under circumstances where communication of audible information is performed using a frequency band nearly equal to a frequency of ringing with the surge, the transfer of audible information is possibly disturbed by power surge followed by ringing, especially since power has a high energy. A surge has a high energy level with the resultant concern over a remarkable increase in energy level of noise in a particular frequency in the presence of frequent occurrences of such surge followed by ringing.

With the structure mentioned above, since the leading time intervals of the drive pulses can be shifted by the given shift amounts, the noise energy of a surge can be diffused by using preferred methods.

Another aspect of the present invention provides a method of operating a switching power element, the method comprising preparing a switching power element, and applying the switching power element with a train of drive pulses in a basic pattern for a repetition cycle time having leading time intervals, associated with leading edges of the drive pulses, and trailing time intervals associated with trailing edges of the drive pulses, with the leading time intervals and the trailing time intervals being different from each other. An inverse number of the repetition cycle time is kept away from an audible band whereby switching frequencies, resulting from the leading time intervals and the trailing time intervals, and associated harmonics do not overlap a given frequency at which noise suppression is needed.

With the operating method described above, the switching power element is driven with the train of drive pulses in the basic pattern for the repetition cycle time with the drive pulses having the leading time intervals and the trailing time intervals that are different from each other to cause the switching frequencies accompanied with harmonics to be diffused in frequency to minimize the energy level of noise resulting from the switching frequencies and the associated harmonics. Additionally, the inverse number of the repetition cycle time is kept away from the audible band. This allows the switching frequencies and associated harmonics to be voided from overlapping the given frequency at which noise suppression is needed.

The leading time intervals and the trailing time intervals may be determined in a leading time interval pattern and a trailing time interval pattern, respectively, such that switching frequencies and associated harmonics resulting from the leading time intervals and the trailing time intervals, are diffused.

With such an operating method, the leading time intervals and the trailing time intervals of the drive pulses are defined in the leading time interval pattern and the trailing time interval pattern. Thus, the drive pulses can drive the switching power element such that the switching frequencies and associated harmonics are lessened in a reliable manner.

The leading time interval pattern and the trailing time interval pattern are set such that the switching frequencies and associated harmonics do not overlap each other in a frequency band for which noise suppression is needed.

With such a method of operating the switching power element, the switching frequencies and associated harmonics do not overlap each other in the frequency band for which noise suppression is needed. Thus, the application of such an operating method to a switching device incorporated in a power electronic device enables communication of audible information in a satisfactory fashion without suffering from disturbance of noise resulting from switching control of the switching power element.

The leading time intervals and the trailing time intervals may be different from each other in the leading time interval pattern and the trailing time interval pattern so as to allow the drive pulses to have given duty cycles, respectively, by which the switching frequencies and associated harmonics do not overlap each other in an audible frequency band.

With the leading time intervals and the trailing time intervals set to be different from each other in the leading time interval pattern and the trailing time interval pattern, the drive pulses have the duty cycles to provide a given duty without causing the switching frequencies and associated harmonics to overlap each other in the audible frequency band. Thus, the train of drive pulses can provide the duty without disturbing the communication of audible information.

The repetition cycle time may comprise a control cycle time including first and second time periods having the leading time intervals in the leading time interval pattern and the trailing time intervals in the trailing time interval patterns, and wherein the first and second time periods allow the drive pulses to have given duty cycles, respectively, which are different from each other.

With the train of drive pulses for the repetition cycle time composed of the first and second time periods under which the drive pulses have the duties different from each other in the first and second time periods, the first and second time periods can provide the duty cycles without causing the switching frequencies and associated harmonics to overlap each other.

The first and second time periods may allow the drive pulses to have an average duty in conformity to a required duty.

With the drive pulses determined in the first and second time periods to provide the average duty in conformity to the required duty, the switching power element can be operated to provide the required duty without causing the switching frequencies and associated harmonics to overlap each other.

The leading edges of the drive pulses may be shifted from beginnings of the leading time intervals by given shift amounts, respectively, such that the switching frequencies and associated harmonics do not overlap each other in a given frequency band.

With the switching power element operated in response to the train of drive pulses whose leading edges are shifted from the beginnings of the leading tile intervals by given shift amounts, harmonics with surge occurring due to the time intervals of the drive pulses can be avoided from overlapping each other in the given frequency band. Thus, communication of audible information can be achieved in a reliable fashion without suffering from the overlapping between the harmonics.

BRIEF DESCRIPTION OF THE DRAWINGS

In the accompanying drawings, in which:

FIG. 13 is a waveform diagram showing surge noise accompanied by ringing caused when a switching power element is operated;

FIG. 14A is a waveform showing a diffusion pattern of surge noise caused by the train of drive pulses generated by the switching device of the present embodiment;

FIG. 14B is a waveform showing a diffusion pattern of surge noise caused by the train of drive pulses generated in the related art practice;

FIG. 17A is a waveform diagram of a train of drive pulses for a repetition cycle time composed of two leading time intervals in a switching control mode of a fourth embodiment according to the present invention;

FIG. 17B is a waveform diagram of another train of drive pulses, whose leading edges are shifted by minimal shift amounts in the switching control mode of the fourth embodiment;

FIG. 18 is a map showing the relationship between a basic frequency and associated harmonics for illustrating probability in which the associated harmonics overlap each other;

FIG. 19A is a waveform diagram of a train of drive pulses associated with three leading time intervals for a repetition cycle time;

FIG. 19B is a view showing how switching frequencies, caused by leading edges of the drive pulses shown in FIG. 19A contain harmonics;

FIG. 19C is a view showing how the switching frequencies and associated harmonics overlap each other;

DETAILED DESCRIPTION OF PREFERRED EMBODIMENTS

First Embodiment

Now, a switching device of a first embodiment according to the present invention is described with reference to the accompanying drawings as being applied to a switching device of a DC-DC converter installed on a hybrid vehicle.

Figure 1:
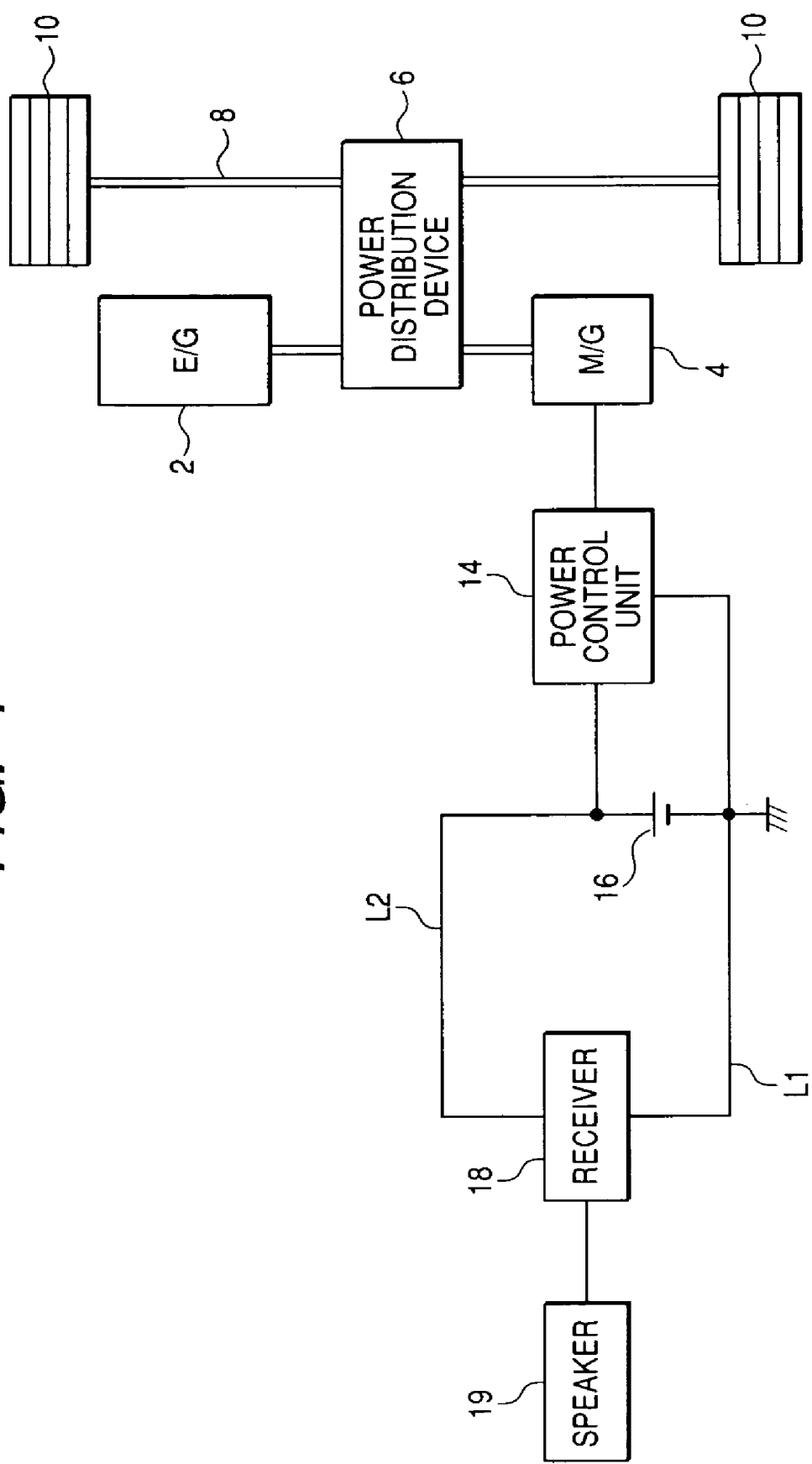
FIG. 1 is a schematic view showing an overall structure of a hybrid vehicle installed with a power control device incorporating a switching device of a first embodiment according to the present invention.

FIG. 1 shows an overall structure of a hybrid vehicle HV to which the switching device of the first embodiment is applied. The hybrid vehicle HV is shown as including an engine 2, a motor generator 4 and a power distribution device 6 connected between the engine 2 and the motor generator 4 to transfer drive powers, resulting therefrom, to drive wheels 10, 10.

The motor generator 4 has a function to provide drive power to the power distribution device 6 and, in addition, a function to receive regenerative power from the power distribution device 6 for generating regenerative electric power. The motor generator 4 is electrically connected to a power control unit 14 that includes a DC-DC converter, an inverter and a high-voltage battery. The power control unit 14 converts AC power, generated from the motor generator 4, to DC power for storage as high-voltage power. Additionally, the power control unit 14 converts high-voltage power to low-voltage power for storage in a battery 16.

Further, a radio receiver 18 and a speaker 19 are installed on the hybrid vehicle HV. The radio receiver 18 includes an AM receiver and an FM receiver. Here, the AM receiver serves to detect and demodulate a modulated wave, whose carrier wave is modulated in an analog AM modulation, to be applied as an audio signal to the speaker 19. This AM broadcast has a frequency band ranging from, for instance, 510 to 1720 kHz. In the meanwhile, the FM receiver serves to detect and demodulate a modulated wave, subjected to frequency modulation, to output an audio signal that is applied to the speaker 19. The FM broadcast has a frequency band ranging from, for instance, 76 to 108 MHz.

Figure 2:
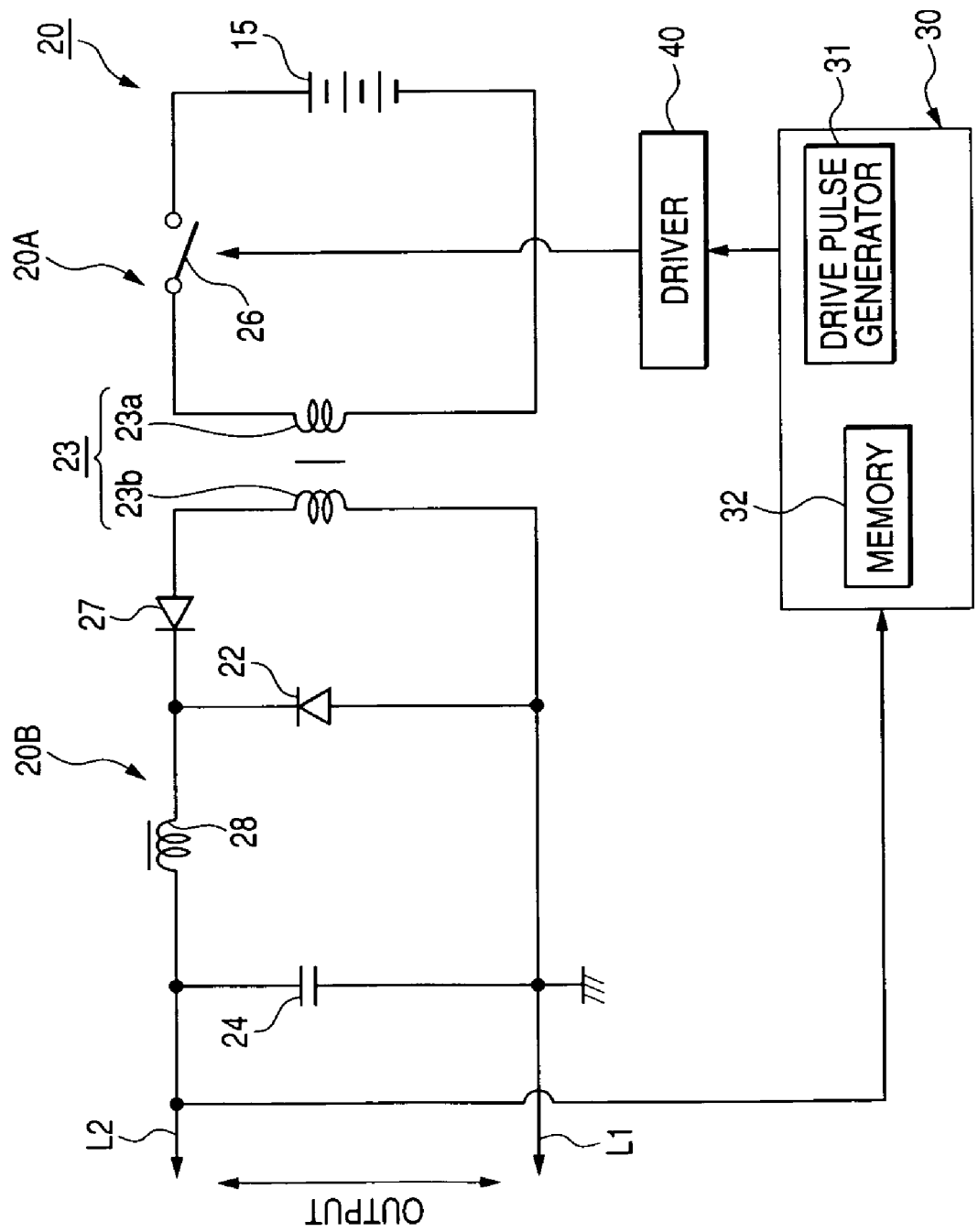
FIG. 2 is a circuit diagram showing a DC-DC converter incorporating the switching device of the first embodiment.

FIG. 2 shows structures of the DC-DC converter 20 and a control device (playing a role as a switching device) of the power control unit 14.

The DC-DC converter 20 is configured as an insulation type DC-DC converter 20. In particular, the DC-DC converter 20 is comprised of a series circuit 20A including a high-voltage battery 15, which stores DC current power delivered from the inverter that inverts AC power generated by the motor generator 4 shown in FIG. 1, a switching power element 26 and a coil 23a of a transformer 23, and a low-voltage circuit 20B adapted to output low-voltage power to the battery 16 (see FIG. 1). Here, the low-voltage circuit 20B is comprised of a coil 23b of the transformer 23, a first diode 27 and an induction coil 18 which are connected to the coil 23b in series. Also, a second diode 22 is connected between a junction point between the first diode 27 and the induction coil 28 and ground. With such a structure, switching control is performed to repetitively turn the switching power element 26 on and off for controlling an output of the DC-DC converter 20.

The switching control is performed by a microcomputer 30 playing a role as the switching device. The microcomputer 30 is comprised of a central processing unit 31, playing a role as a drive pulse generator, a frequency diffuser unit and a duty control unit, and a memory 32 arranged to store a basic pattern for a train of drive pulses to be generated by the drive pulse generator 31. The microcomputer 30 is applied with the power output from the DC-DC converter 20 and causes the central processing unit 31 to generate the train of drive pulses under the basic pattern stored in the memory 32 for performing switching control upon which a driver 40 turns the switching power transistor 26 on and off so as to control the DC-DC converter 20 to a desired power output. More particularly, the microcomputer 30 allows the central processing unit 31 to serve as the drive pulse generator to output the train of drive pulses through the driver 40 to the switching power transistor 26 in a manner described below in detail.

During switching operations of the switching power element 26 under such switching control, the switching power element 26 generates noises that possibly overlap a frequency of a broadcast station selected by the receiver 18. Noises, resulting from such switching control, include not only radiation noise but also line noise passing through lines L1, L2 shown in FIG. 2. That is, the line L1, connected to ground of the receiver 18, is connected to the DC-DC converter 20 of the power control unit 14 and the line L2, through which the receiver 18 and the battery 16 are connected, is connected to the DC-DC converter 20 of the power control unit 14, causing noises resulting from the DC-DC converter 20 to be applied to the receiver 18 via the lines L1, L2.

Noises, resulting from such switching control, are mixed to the frequency of the selected broadcast station particularly when the frequency of the broadcast station received by the receiver 18 is overlapped with the switching frequencies and associated harmonics caused by switching control. Hereunder, a detail of noises will be described with reference to FIGS. 3A to 3C, FIG. 4 and FIG. 5.

Figure 3A:
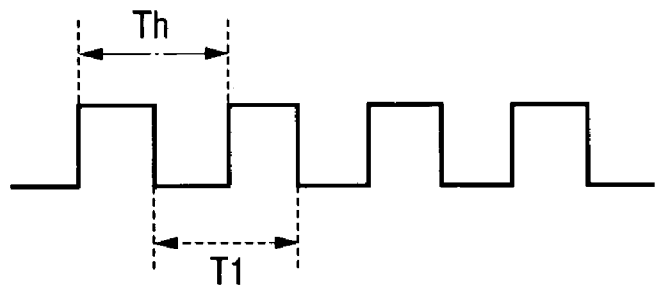
FIG. 3A is a waveform diagram of a train of drive pulse used in the related art practice for turning a switching power transistor on and off.

FIG. 3A shows a train of drive pulses for driving the switching power transistor 26 in a manner as practiced in the related art switching device. In this connection, the switching power transistor 26 is turned on during an on-time (during a period with "H" in logic level) or during an off-time (during a period with "L" in logic level). For instance, with the switching power transistor 26 including an N-channel MOS transistor, the switching power transistor 26 is turned on during a period wherein the drive pulse remains in "H" logic level. Also, with the switching power transistor 26 including a P-channel MOS transistor, the switching power transistor 26 is turned on during a period wherein the drive pulse remains in "L" logic level. Also, the present invention will be described hereinafter in conjunction with an exemplary case where the switching power transistor 26 is turned on during on-time wherein the drive pulse remains in "H" logic level.

Figure 3B:
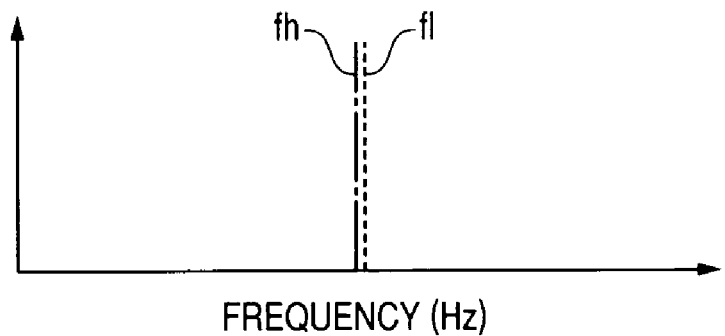
FIG. 3B is a view illustrating a status wherein switching frequencies, resulting from time intervals of the drive pulses, overlap each other.
Figure 3C:
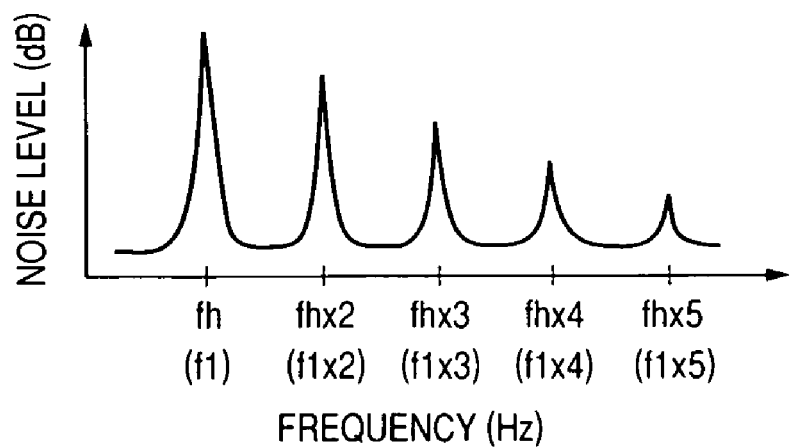
FIG. 3C is a view illustrating noise levels of the switching frequencies caused by the train drive pulses shown in FIG. 3A.

With a waveform of the train of drive pulses shown in FIG. 3A practiced in the related art, the drive pulses d1, d2 have leading edges a1, a2 with a time interval Th and trailing edges b1, b2 with a time interval Tl. The time intervals Th and Tl are set to be equal to each other. Therefore, respective switching frequencies fh, fl, representing inverse numbers of these time intervals, occur at the same frequency as shown in FIG. 3B, resulting in an increase in an average energy level of noises at the switching frequencies fh, fl (with the switching frequencies fh, fl being plotted in FIG. 3B at slightly deviated points for the sake of clarity). Accordingly, as shown in FIG. 3C, noises have increased energy levels at the switching frequencies fh, fl and frequencies of associated harmonics "fh×2, fh×3, fh×4, fh×5 (fl×2, fl×3, fl×4, fl×5)".

Figure 4:
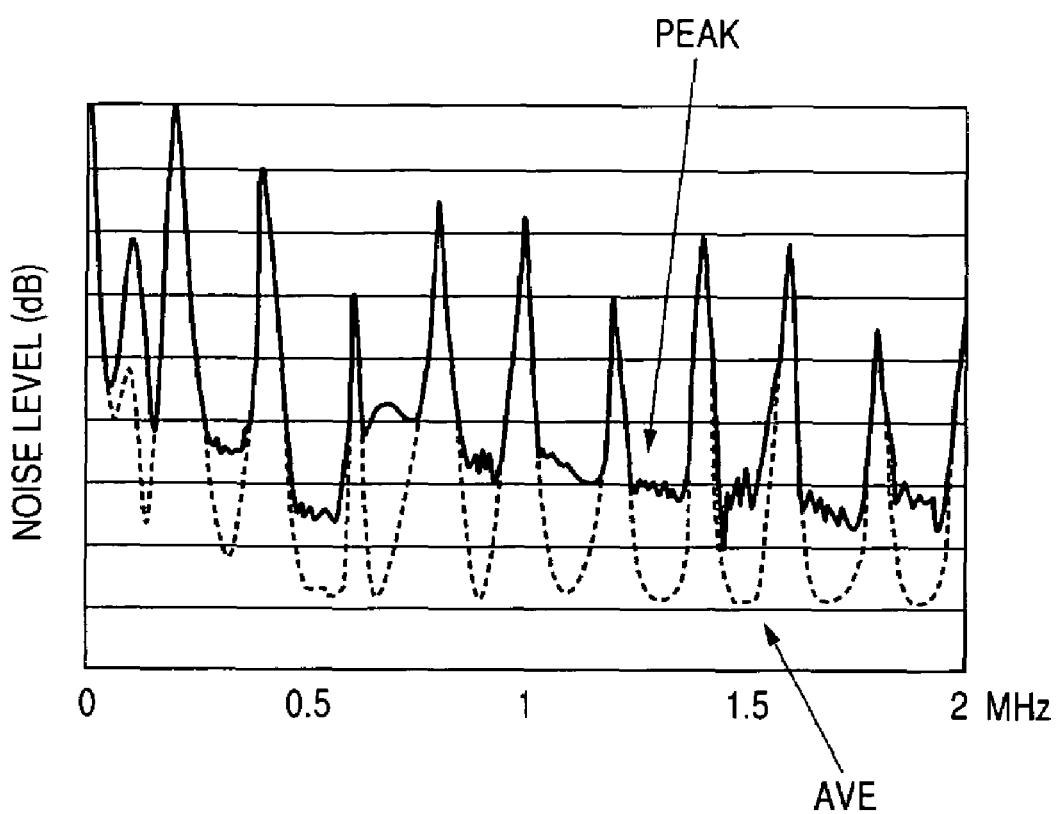
FIG. 4 is a view illustrating an analyzed result of noise levels of the switching frequencies encountered in the switching device of the related art.

FIG. 4 shows an experimental test result on energy levels of noises appearing when the switching power transistor is operated under switching control using the train of drive pulses shown in FIG. 3A. As shown in FIG. 4, both of peak noises, indicated in solid lines, and average noises, indicated in broken lines, demonstrate high energy levels, respectively.

Here, in order to reduce the energy levels of noises resulting from the switching frequencies, various control methods may be conceivably executed including: (a) PWM control in which on-times of respective drive pulses are randomized; (b) PWM control in which a plurality of switching frequencies are set; and (c) switching control that is executed under a specified pattern such that leading edges and trailing edges of drive pulses are diffused so as to prevent the leading edges and trailing edges of the drive pulses do not occur at a fixed intervals.

Figure 5:
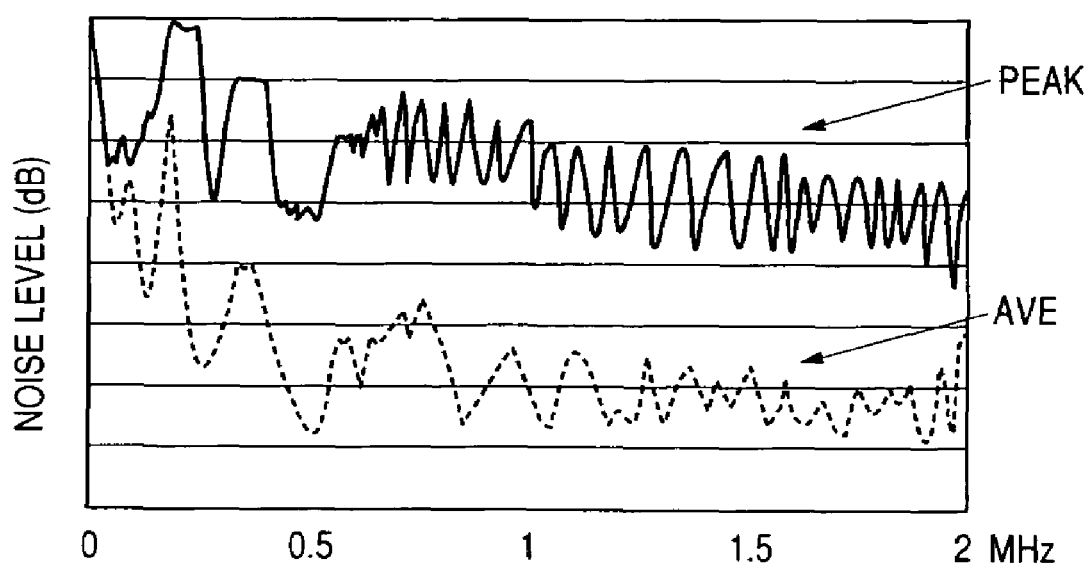
FIG. 5 is a view illustrating another analyzed result of noise levels of the switching frequencies encountered in the switching device of the related art.

FIG. 5 shows an experimental test result on energy levels of typical noises occurring when switching controls are performed using such control methods set forth above. As shown in FIG. 5, performing switching controls using the control methods noted above allows remarkable reduction in average energy level of noises. That is, the experimental test result, shown in FIG. 5, demonstrates further reduction in average energy level of noises than those of FIG. 4.

However, although the average energy level of noises is minimized, the switching frequencies and associated harmonics are probable to overlap a frequency of a broadcast station selected by the receiver 18, causing the speaker 19 to output back noises. Of course, if a train of drive pulses is generated under a particular pattern so as to avoid the occurrence of the switching frequencies and associated harmonics overlapping the frequency of the broadcast station, the issue of back noises can be addressed. However, such setting is hard to be achieved as mentioned above.

Figure 6A:
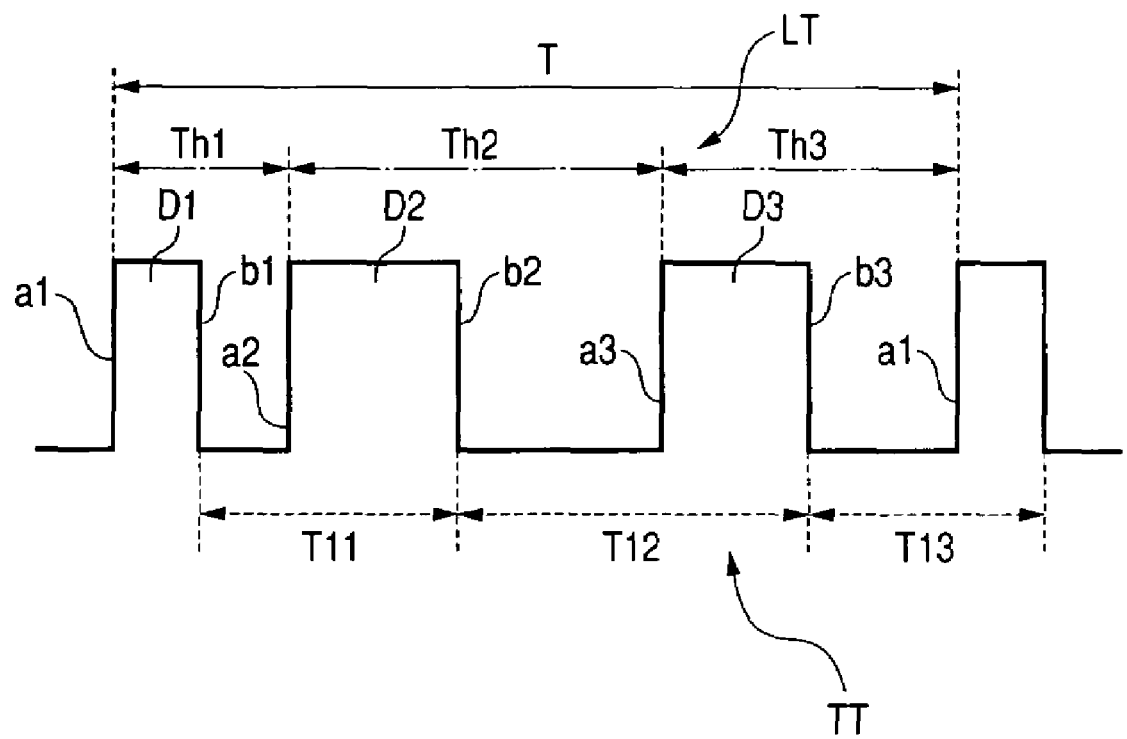
FIG. 6A is a waveform diagram of a train of drive pulses generated by the switching device of the first embodiment shown in FIG. 2 for a method of operating the switching power transistor to be executed by the switching device of the first embodiment.

With the present embodiment, the drive pulse generator 31 generates a train of drive pulses D1 to D3 for a repetition cycle time T as shown in FIG. 6A. In particular, the drive pulses D1 to D3 have a leading time interval pattern LT including leading time intervals Th1 to Th3 related to leading edges a1, a2, a3 of the drive pulses D1 to D3 at which the switching power transistor is turned on, and a trailing time interval pattern TT including trailing time intervals Tl1 to Tl3 related to trailing edges b1, b2, b3 of the drive pulses D1 to D3, at which the switching power transistor is turned off. The leading time intervals Th1 to Th3 and the trailing time intervals Tl1 to Tl3 are set to be different from each other. With such leading and trailing time interval patterns, the switching frequencies are diffused in various frequency levels. A diffusion frequency, representing an inverse number of the repetitive cycle time T, is set to be higher than an audible frequency. Thus, the drive pulse generator 31 plays a role as the frequency diffuser unit as set forth above.

Figure 6B:
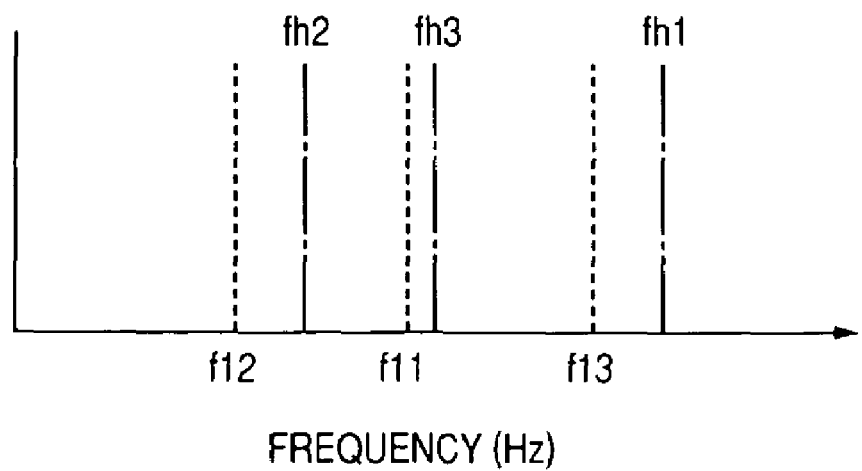
FIG. 6B is a view showing how the switching frequencies resulting from time intervals of the drive pulses shown in FIG. 6A.

With such leading and trailing time interval patterns, switching frequencies fh1 to fh3, associated with the leading time intervals Th1 to Th3, and switching frequencies fl1 to fl3, associated with the trailing time intervals Tl1 to Tl3, are different from each other. Thus, the switching frequencies fh1 to fh3 and the switching frequencies fl1 to fl3 are diffused at various levels as shown in FIG. 6B. This results in reduction of average noise due to such diffused switching frequencies.

However, even if the train of drive pulses is generated under such leading and trailing time interval patterns, either one of the switching frequencies fh1 to fh3 and the switching frequencies fl1 to fl3 or either one of the associated harmonics are probable to overlap a frequency of an AM broadcast station received by the receiver 18 with the resultant occurrence of noise outputted by the speaker 19. To address such an issue, the present embodiment contemplates the provision of the memory 32 of the microcomputer 30 configured such that the diffusion frequency, representing the inverse number of the repetition cycle time T of the train of drive pulses, is set to be greater than an audible frequency. Therefore, even if either one of the switching frequencies fh1 to fh3 and the switching frequencies fl1 to fl3 or either one of the associated harmonics discontinuously overlap the frequency of the AM broadcast station received by the receiver 18, an inverse number of a time interval between a preceding overlapping state and a subsequent overlapping state becomes higher than the audible frequency. Accordingly, noises outputted from speaker on a final stage do not fall in an audible frequency band, thereby appropriately suppressing audio noises from overlapping an audio signal of the broadcast station to be outputted by the speaker 19.

As used herein, the expression "to be higher than the audible frequency" refers to a frequency higher than, for instance, "20 kHz". This is due to the fact that the audible frequency is said to fall in a range of "20 Hz to 20 kHz". Of course, such a value is not absolute. In actual practice, there a difference in hearing of humans between individuals and it is rare for an acoustic wave in a range of, for instance, "20 kHz" to be caught by the humans. Therefore, setting the diffusion frequency to the value higher than a value of, for instance, "15 kHz" results in remarkable effect.

Figure 7A:
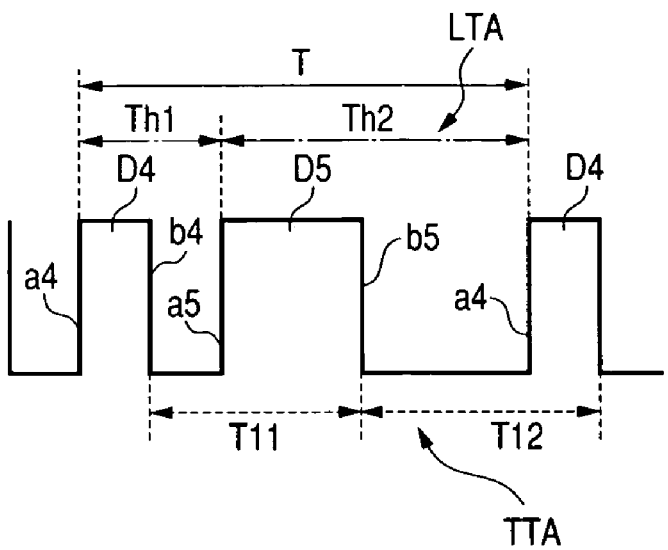
FIG. 7A is a waveform diagram of another train of drive pulses generated by the switching device shown in FIG. 2.
Figure 7B:
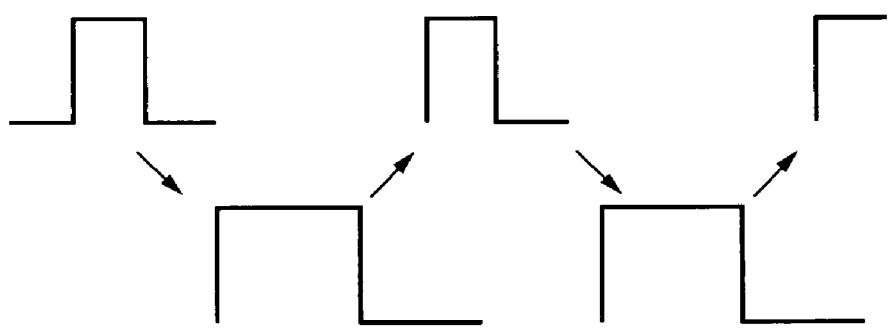
FIG. 7B is a schematic view showing how the two drive pulses are switched over at a speed higher than an audible frequency.

FIG. 7A shows another example of a train of two drive pulses D4, D5 for a repetition cycle time TA that is stored in the memory 32 of the microcomputer 30. The drive pulses D4, D5 have leading edges a4, a5 and trailing edges b4, b5. The repetition cycle time TA includes a leading time interval pattern LTA having leading time intervals Th1, Th2, associated with the leading edges a4, a5 and the leading edges a5, a4, respectively, and a trailing time interval pattern TTA having trailing time intervals Tl1, Tl2, associated with the trailing edges b4, b5 and the trailing edges b5, b4, respectively. The leading time intervals Th1, Th2 and the trailing time intervals Tl1, Tl2 are set to be different from each other. Further, the drive pulse generator 31 of the switching device 30 (see FIG. 2) is arranged to generate the train of drive pulses D4, D5 such that an inverse number of the repetition cycle time TA is set to be higher than an audible frequency whereby the two drive pulses D4, D5 are switched at a speed higher than the audible frequency as shown in FIG. 7B.

Thus, by switching the drive pulses D4, D5 at the speed higher than the audible frequency, even if the switching frequency fh2 is caused to match a frequency (of, for instance, "600 kHz") of one radio station for an AM radio broadcast, no noise resulting from the switching frequency is mixed to outputs of the speaker 19 in the audible frequency band.

Figure 7C:
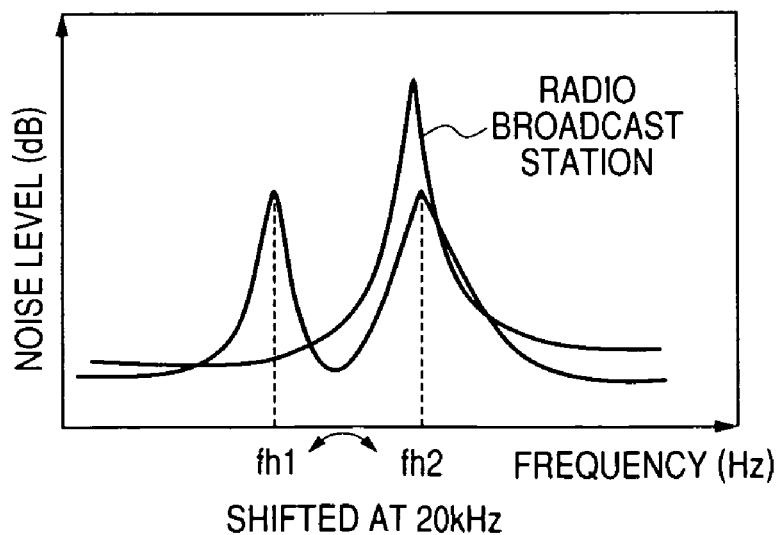
FIG. 7C is a view showing how the switching frequencies are switched over at the speed higher than the audible frequency.

However, as exemplified in FIG. 7C, if the switching frequencies are set to an AM radio broadcasting band, the memory 32 of the microcomputer 30 stores a train of drive pulses to cause the drive pulse generator 31 to generate switching frequencies in diffused timings with a difference in frequency between the switching frequencies set to a value greater than a frequency width (band width) for one station of the AM radio broadcast station. That is, due to a regulation under which a bandwidth allocated to a broadcast station for one station is preliminarily determined to allow an AM radio broadcast in Japan to have each station with a bandwidth allocated to, for instance, "9 kHz", the drive pulse generator 31 generates the train of drive pulses such that the switching frequencies are diffused in timing to provide a frequency difference greater than such a bandwidth. With such a configuration of the drive pulse generator 31, even if a frequency of a broadcast station received by the receiver 18 is caused to match the switching frequencies, a whole of the switching frequencies can be avoided from matching a frequency of a particular broadcast station. Therefore, even under circumstances where the switching frequencies match the frequency of the particular broadcast station, these frequencies can be caused to match in discontinuous fashion.

Now, description is made of results on FFT characteristic evaluation of audio signals of an AM radiobroadcast under situations where the diffusion frequencies are set to lie in an audible frequency band and fall in a range outside the audible frequency band.

Figure 8A:
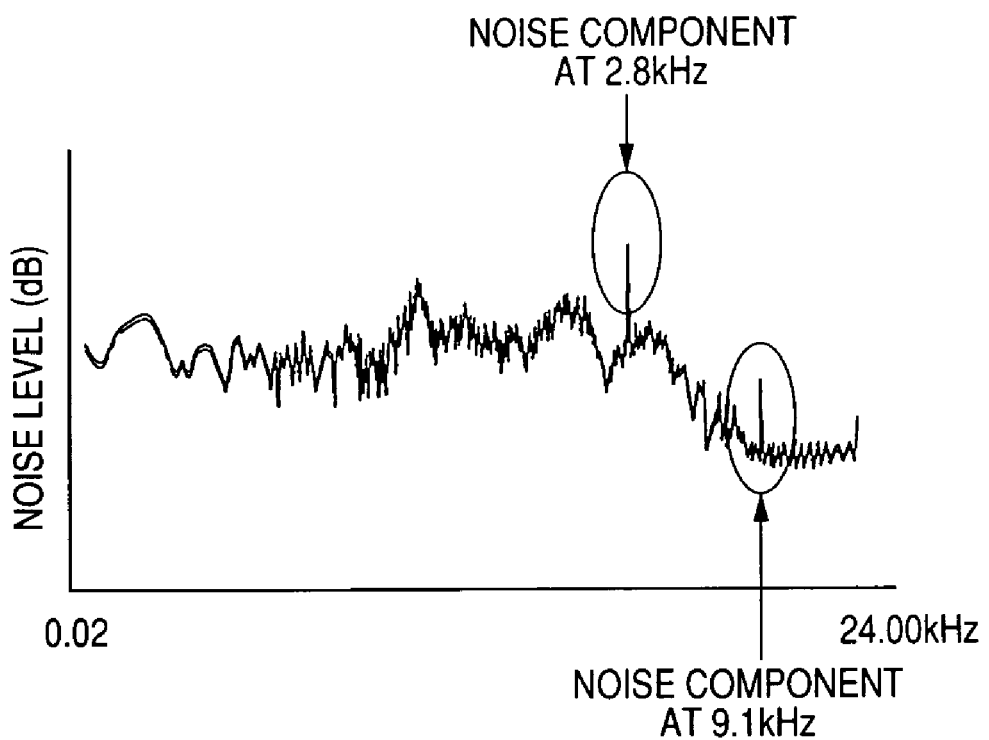
FIG. 8A is a view showing a result of measuring a noise level caused by switching control of the present embodiment.
Figure 8B:
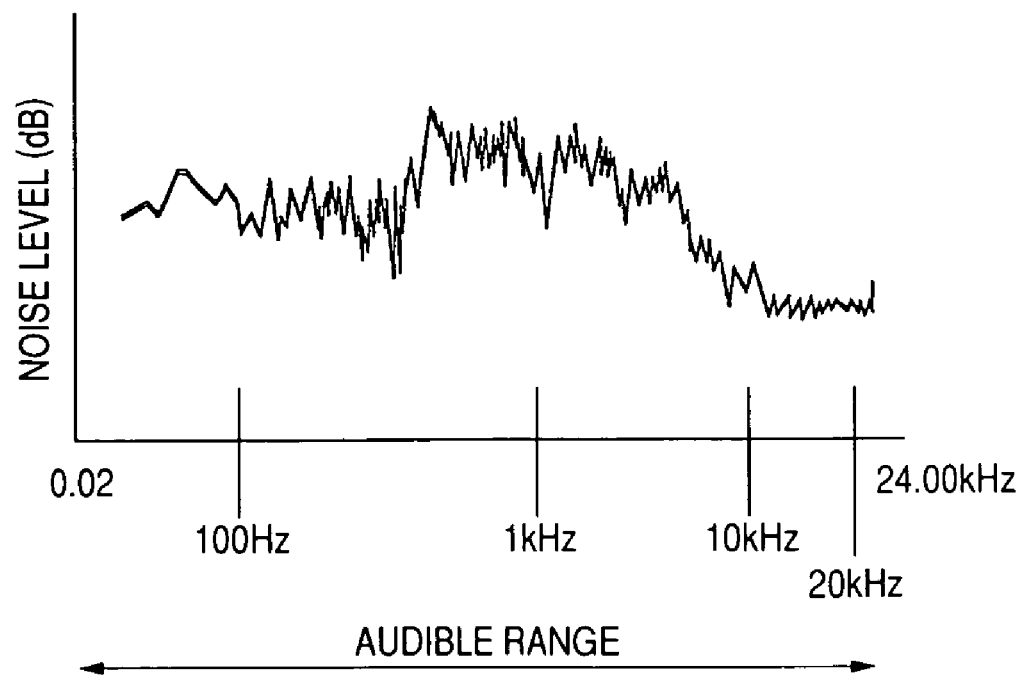
FIG. 8B is a view showing another result of measuring a noise level caused by switching control of the present embodiment wherein the switching frequencies are diffused to a level higher than the audible frequency.

FIGS. 8A and 8B show evaluation results of FFT analyses conducted on signals outputted from the speaker 19 of the AM receiver under conditions where the switching power transistor 26 is turned on and off using the train of drive pulses D4, D5, defined in the leading and trailing time interval patterns LTA, TTA as shown in FIG. 7A, which is generated by the drive pulse generator 31 of the switching device 30 with the diffused switching frequencies. FIG. 8A shows the analysis result of noises appearing when the diffused frequencies fall in the audible frequency band and FIG. 8B shows the other analysis result of noises appearing when the diffused frequencies are set to be higher than the audible frequency band.

With the FFT analysis result shown in FIG. 8A, the audio signal is overlapped with noise at a frequency of "2.8 kHz", causing the speaker 19 to output noise in a sound like "Pea". Also, the audio signal is overlapped with noise at a frequency of "9.1 kHz", causing the speaker 19 to output a sound in screeching noise. On the contrary, in an example shown in FIG. 8B, no peak noise is present within the audible frequency band.

Thus, with the drive pulse generator 31 configured to generate the trains of drive pulses in the leading and railing time interval patterns shown in FIGS. 6A and 7A, the switching frequencies can be diffused at levels with no adverse affects on the audible frequency of the output from the speaker 19. However, in order for the DC-DC converter 20 to generate a desired output, the train of drive pulses cannot be fixed in time interval and is required to have varying duty cycles. Depending duty cycles of the train of drive pulses, the leading and trailing time interval patterns, composed of the time intervals Th1, Th2 and the time intervals Tl1, Tl2, respectively, are probable not to satisfy the relationship mentioned above. Then, the switching frequencies possibly overlap each other, resulting in inconvenience with an increase in energy level of radiation noise resulting from the switching frequencies. Hereunder, such inconvenience is described below.

With the present embodiment, the memory 32 of the microcomputer 30, shown in FIG. 2, is arranged to store a train of drive pulses defined in leading and trailing time intervals associated with leading and trailing edges, respectively, in leading and trailing time interval patterns. In storing the leading edges of the drive pulses, the memory 32 stores duty cycles of the drive pulses needed for the DC-DC converter 20 to generate a desired output.

Figure 9A:
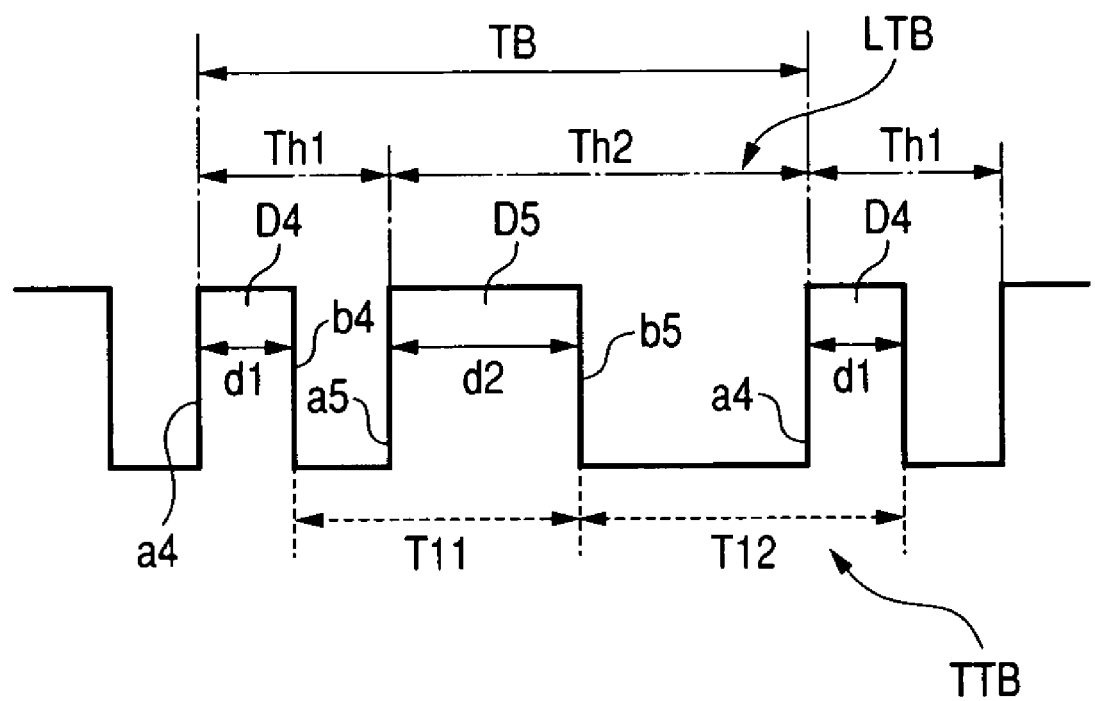
FIG. 9A is a waveform diagram showing a train of drive pulses formed in a basic pattern composed of two time intervals for illustrating an issue of switching frequencies caused by trailing edges of the time intervals.
Figure 9B:
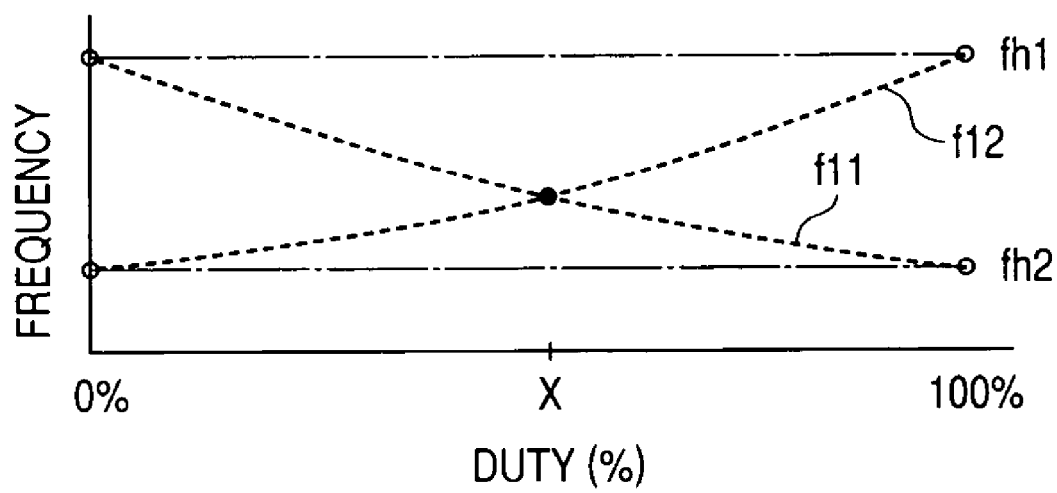
FIG. 9B is a view illustrating the relationship between duty, provided by the train of drive pulses, and switching frequencies caused by the trailing edges.

FIG. 9A is a waveform diagram of a train of drive pulses D4, D5 with duty cycles d1, d2 for a repetition cycle time TB composed of leading time intervals Th1, Th2 and trailing time intervals Tl1, Tl2 under leading and trailing time interval patterns LTB, TTB, respectively. As shown in FIG. 9A, under a situation where the drive pulses D4, D5 have the leading time intervals Th1, Th2 between the leading edges a4, a5 and between the leading edges a5, a4, respectively, the trailing time intervals Tl1, Tl2 are determined to cause the drive pulses D4, D5 to have the duty cycles d1, d2, respectively. With such a waveform of the drive pulses D4, D5, the switching frequencies fl1, fl2, resulting from the trailing time intervals Tl1, Tl2, vary in a mode shown in FIG. 9B due to the drive pulses D4, D5 having the duty cycles d1, d2, respectively. In FIG. 9B, if the drive pulse has a "X %" duty cycle, two switching frequencies, resulting from the trailing time intervals Tl1, Tl2 associated with the trailing edges b4, b5 and the trailing edges b5, b4, respectively, are caused to match each other.

Figure 10A:
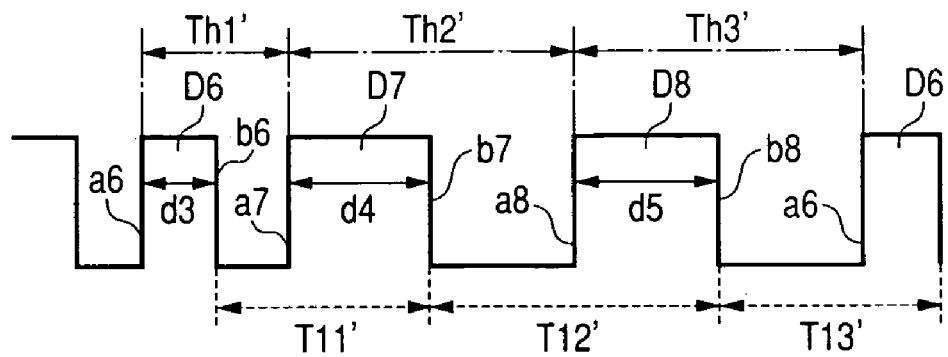
FIG. 10A is a waveform diagram showing a train of drive pulses with three time intervals for illustrating an issue of switching frequencies caused by trailing edges of the three time intervals.
Figure 10B:
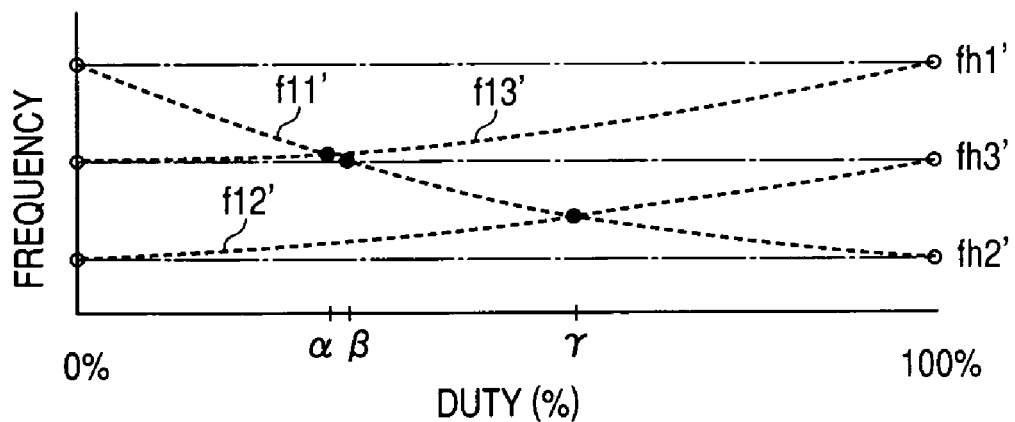
FIG. 10B is a view illustrating the relationship between duty, provided by the train of drive pulses, and switching frequencies caused by the trailing edges of the three time intervals.
Figure 11:
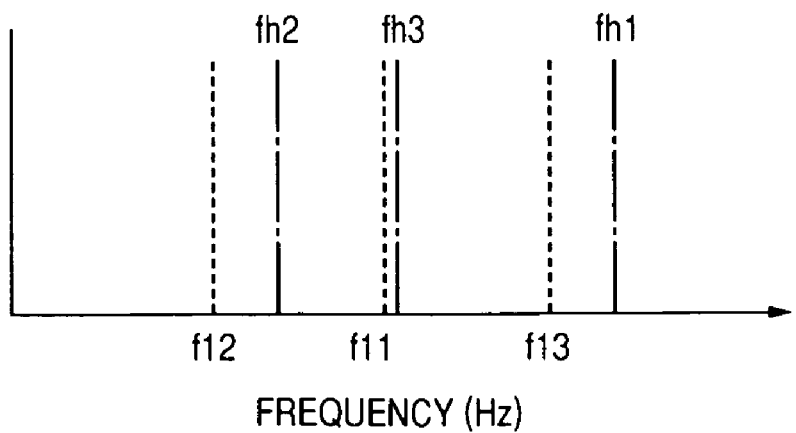
FIG. 11 is a view illustrating the relationship between duty of the train of drive pulses and an overlapping status of switching frequencies.

FIGS. 10A and 10B show the relationship between switching frequencies, resulting from a train of drive pulses D6 to D8, and duty control. In FIG. 10A, the train of drive pulses D6 to D8 has a repetition cycle time TB' having leading time intervals Th1' to Th3' defined in a leading time interval pattern LTB' and trailing time intervals Tl1' to Tl3' defined in a trailing time interval pattern TTB'. The leading time interval Th1' is defined by leading edges a6, a7 of the drive pulses D6, D7; the leading time interval Th2' is defined between leading edges a7, a8 of the drive pulses D7, D8; and leading time intervals Th3' is defined between leading edges a8, a6 of the drive pulses D8, D1. Likewise, trailing time interval Tl1' is defined between trailing edges b6, b7; trailing time interval Tl2' is defined between trailing edges b7, b8; and trailing time interval Tl3' is defined between trailing edges b8, b6 of the drive pulses D8, D6. The duty cycles d3 to d5 of the drive pulses D6 to D8 are defined by the leading time intervals Th1' to Th3' and the trailing time intervals Tl1' to Tl3'. As shown in FIG. 10A, under a situation where the repetition cycle time TB' has the three trailing time intervals Th1' to Th3' set to be different from each other, the duty cycles d3 to d5 of the drive pulses D5 to D8 are determined by the trailing time intervals Tl1' to Tl3'. With such a waveform of the drive pulses D6 to D8, the switching frequencies fl1' to fl3', resulting from the trailing time intervals Tl1' to Tl3', vary in a mode shown in FIG. 10B. In FIG. 10B, if the drive pulses have the duty cycles of "α %", "β %" and "γ %", the switching frequencies, appearing in the leading time intervals, associated with the leading edges of the drive pulses, and the trailing time intervals associated with the trailing edges of the drive pulses, match each other. Therefore, for given duty cycles, even if the switching frequencies are diffused in timings as shown in FIG. 6B, variation in the duty cycles of the drive pulses causes the switching frequencies to overlap each other as shown in FIG. 1.

Further, under situations where a train of drive pulses has four leading time intervals associated with leading edges of the drive pulses, the duty in which the switching frequencies match each other include maximal "nine points". In this connection, it will be appreciated that the greater the number of leading time intervals (the number of switching frequencies) involved in the train of drive pulses for each repetition cycle time in a basic pattern, the greater will be the value of duty in which the switching frequencies match each other.

Thus, with duty control being executed in such a way, the switching frequencies possibly match each other depending on the preset duty cycles. To address such an issue, the present embodiment contemplates that the drive pulse generator 31 generates a plurality of trains of drive pulses for repetition cycle times in a plurality of basic patterns (exemplified in two basic patterns in the present embodiment) one of which is selected depending on a required duty cycle.

FIGS. 12A to 12D show duty control modes to be executed by the present embodiment. With the present embodiment, the memory 32 of the microcomputer 30 is arranged to store a first train of drive pulses defined in a first basic pattern P1, shown in FIG. 12A, and a second train of drive pulses defined in a second basic pattern P2 shown in FIG. 12B.

Figure 12A:
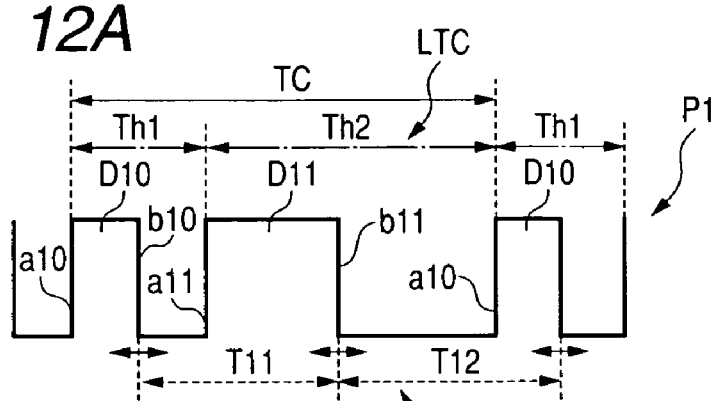
FIGS. 12A and 12B are waveform diagrams of first and second trains of drive pulses based on first and second basic patterns to be switched over depending on an overlapping status of switching frequencies.

As shown in FIG. 12A, the first train of drive pulses D10, D11 has a repetition cycle time TC including leading time intervals Th1, Th2 in a leading time interval pattern LTC and trailing time intervals Tl1, Tl2 in a trailing time interval pattern TTC under a first basic pattern. The leading time interval Th1 is defined between leading edges a10, a11 of the drive pulses D10, D11 and the leading time interval Th2 is defined between leading edges a11, a10 of the drive pulses D11, D10. Likewise, the trailing time interval Tl1 is defined between trailing edges b10, b11 of the drive pulses D10, D11 and the trailing time interval Tl2 is defined between trailing edges b11, b10 of the drive pulses D11, D10.

Figure 12B:
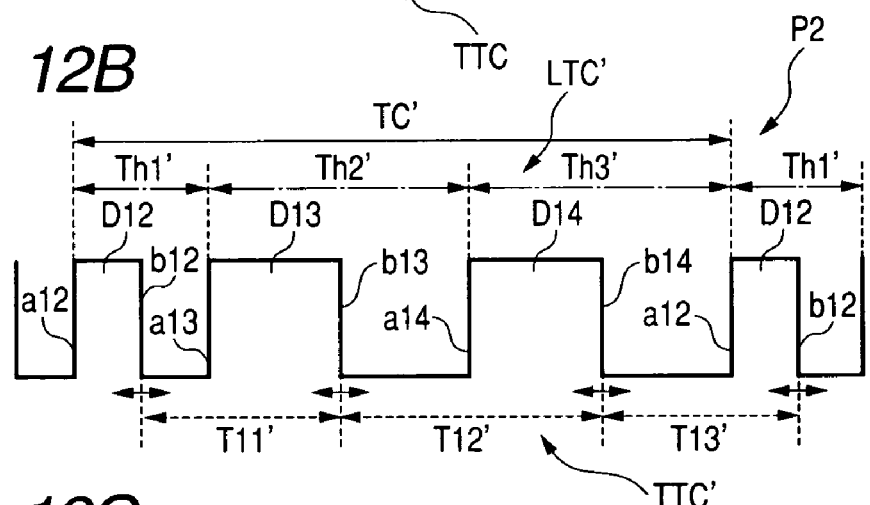

As shown in FIG. 12B, the second train of drive pulses D12 to D14 has a repetition cycle time TC' including leading time intervals Th1' to Th3' in a leading time interval pattern LTC' and trailing time intervals Tl1' to Tl3' in a trailing time interval pattern TTC' under a second basic pattern. The leading time interval Th1' is defined between leading edges a12, a13 of the drive pulses D12, D13; the leading time interval Th2' is defined between leading edges a13, a14 of the drive pulses D13, D14; and the leading time interval Th3' is defined between leading edges a14, a12 of the drive pulses D14, D12. Likewise, the trailing time interval Tl1' is defined between trailing edges b12, b13 of the drive pulses D12, D13; the trailing time interval Tl2' is defined between trailing edges b13, b14 of the drive pulses D13, D14; and the trailing time interval Tl3' is defined between trailing edges b14, b12 of the drive pulses D14, D12.

Here, information of the first train of drive pulses D10, D11 under the first basic pattern P1, to be stored in the memory 32, includes the leading time intervals Th1, Th2, related to the leading edges a10, a11, and a sequence of these time intervals. In this respect, the repetition cycle time TC (=Th1+Th2) of the first basic pattern P1 is set to be higher than an audible frequency. Also, information of the second train of drive pulses D12 to D14 under the second basic pattern P2, include leading time intervals Th1' to Th3', related to the leading edges a12 to a14, and a sequence of these time intervals. Incidentally, the repetition cycle time TC' (=Th1'+Th2'+Th3') of the second basic pattern P2 is set to be higher than the audible frequency. The drive pulse generator 31 generates one of the trains of drive pulses under the basic patterns P1, P2 depending on the overlapping status between the switching frequencies. Thus, the drive pulse generator 31 plays a role as the duty control unit.

Figure 12C:
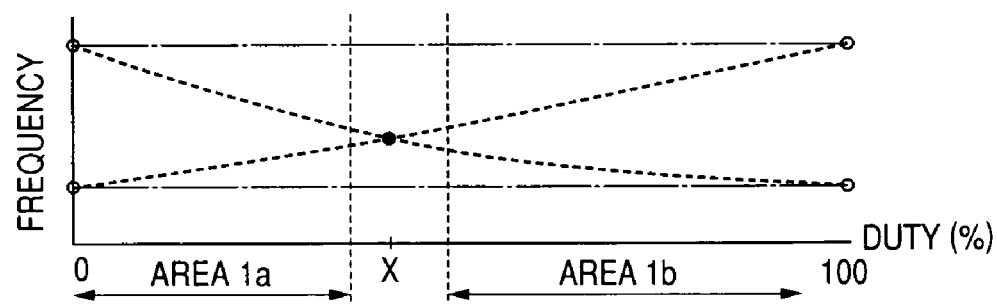
FIGS. 12C and 12D are views for illustrating areas of duties to be provided by the trains of drive pulses under the first and second basic patterns.
Figure 12D:
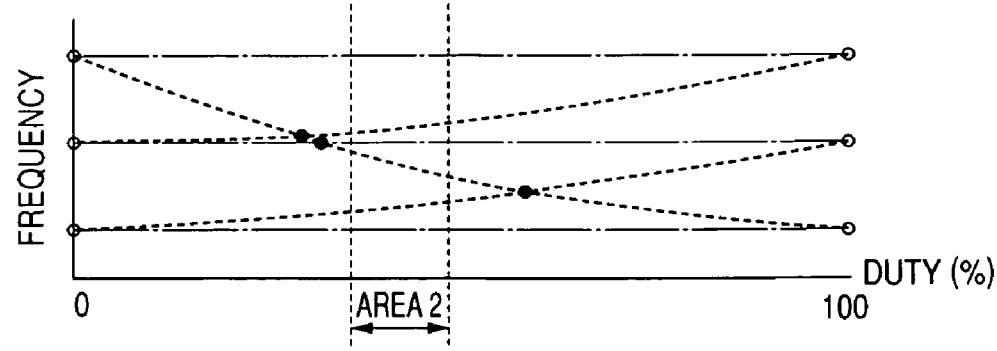

FIG. 12C shows areas in which the train of drive pulses is available to have duty cycles in the basic pattern P1 and FIG. 12C shows the other area in which the train of drive pulses is available to have duty cycles in the basic pattern P2. With the present embodiment, the memory 32 of the microcomputer 30 stores first areas 1a, 1b, shown in FIG. 12C, in which the first basic pattern P1 is available to take the duty cycles for the drive pulses, and the second area 2, shown in FIG. 12D, in which the second basic pattern P1 is available to take the duty cycles for the drive pulses. With such arrangement, the first and second trains of drive pulses can be shifted either in the basic patterns P1, P2 depending on a required duty cycle. Thus, the duty cycles of the drive pulses can be variably controlled such that no overlapping takes place among the switching frequencies created in the leading time intervals related to the leading edges and the trailing time intervals related to the trailing edges. Incidentally, it will be appreciated that the first areas 1a, 1b and the second area 2 are set to satisfy a condition where none of the duty cycles available on the first and second basic patterns P1, P2 overlap each other. Moreover, the duty cycles are set under conditions where both ends of the second area 2 are proximate to the first areas 1a, 1b and the duty cycles can be consecutively set.

Upon setting the first and second basic patterns and performing duty control in such modes set forth above, the switching frequencies can be diffused, avoiding energy levels of noises caused by switching control from increasing in particular frequency. In addition, selecting the diffused frequencies, each representing the inverse number of the repetition cycle time of the basic patter, to be higher than the audible frequency provides no probability for noises, outputted from the speaker 19, to fall in the audible frequency range even if the diffused switching frequencies or the associated harmonics overlap a frequency of a broadcast station received by the receiver 18.

Therefore, with the present embodiment, a user can hear an AM broadcast in favorable quality even when the switching frequencies are set to a long wave (LW), in which harmonics of a relatively low order overlap an AM broadcast frequency band, and a middle wave (MW) falling in the AM broadcast frequency band. Additionally, setting the switching frequencies to such a high frequency range enables the DC-DC converter 20 to be minimized in size. However, if the switching frequencies are set to such a relatively high frequency range, the drive pulses are caused to have leading edges and trailing edges each in increased gradient, resulting in an increase in surge noises occurring during turn-on and turn-off operations of the switching power transistor 26.

As used herein, the term "surge" refers to "peak noise", occurring in synchronism with turn-on or turn-off operations of the switching power transistor 26 and designated at "S" in FIG. 13, and the following "ringing" vibrating in attenuated degrees and designated at "R" in FIG. 13. Such vibrating noise has a frequency (ringing frequency) that includes a resonant frequency resulting from peculiar structures of peripheral circuits such as those including a peripheral snubber circuit and wiring inductance or the like around the switching power transistor 26. Also, due to increased probability in which the ringing frequency normally falls in a range from "several MHz to several hundreds MHz", surge noise and ringing noise are apt to overlap a frequency band of an FM broadcast.

However, with the present embodiment, the switching frequencies occurs at diffused timings under the diffused time intervals Th1' to Th3' different from each other for a repetition cycle time as shown in FIG. 14A. Therefore, surge noise and ringing noise occur in diffused lower energies than those of surge noise and ringing noise caused by the switching frequencies occurring at fixed time intervals Th of the train of drive pulses practiced in the prior art shown in FIG. 14B. Thus, the frequency diffusion based on the basic patterns set forth above also provides noise suppression effect for the FM broadcast frequency band.

The present embodiment mentioned above provides advantageous effects as described below.

(1) The switching power transistor 26 can be operated in response to the train of drive pulses having the leading time intervals, associated with the leading edges of the drive pulses in the leading time interval pattern, and the trailing time intervals, associated with the trailing edges of the drive pulses in the trailing time interval pattern, which are different from each other for the repetition cycle time while the diffusion frequency, representing the inverse number of the repetition cycle time, is set to be higher than the audible frequency. Thus, by diffusing the frequency, an average level of noise caused by switching control can be reduced. Moreover, with the diffusion frequency being set to be higher than the audible frequency, no noise is outputted from the speaker 19 on a final stage, appropriately eliminating disturbance on acoustic information in communication.

(2) With the present embodiment, the drive pulse generator of the switching device is configured to generate the train of drive pulses that is set in the basic pattern for the repetition cycle time, including a plurality of leading time intervals associated with the leading edges of the drive pulses in the leading time interval pattern, and have duty cycles determined by the trailing time intervals associated with the trailing edges of the drive pulses in the trailing time interval pattern so as to preclude the switching frequencies from overlapping each other. This results in avoidance of an increase in an energy level of noise due to the time intervals, associated with the leading or trailing edges of the drive pulses, overlapping each other at fixed time intervals.

(3) The drive pulse generator of the switching device is configured to select one of the first and second trains of drive pulses with waveforms in the first and second basic patterns differing from each other depending on required duty cycles for the drive pulses. With such configuration, if probability occurs for the switching frequencies to overlap each other when one of the first and second basic patterns is selected to provide one of the first and second trains of drive pulses in required duty cycles, then, the other one of the first and second basic patterns is selected to avoid the switching frequencies from overlapping each other. This makes it possible to operate the switching transistor with the train of drive pulses having required duty cycles while appropriately avoiding the switching frequencies from overlapping each other.

Second Embodiment

Next, a second embodiment is described below with reference to the accompanying drawings with a focus on points differing from the first embodiment.

With the first embodiment, the drive pulse generator of the switching device is configured to generate the plural trains of drive pulses defined in a plurality of basic patterns different from each other and one of the trains of drive pulses is selected depending on required duty cycles for the drive pulses. On the contrary, with the present embodiment, variable duty control is performed in a way wherein a control cycle time includes time periods in first and second basic patterns arranged to cause first and second trains of drive pulses to provide duties different from each other under conditions where an average duty is made equal to a required duty.

More particularly, with the second embodiment, only the first train of drive pulses D10, D11 for the repetition cycle time TC in the basic pattern P1, shown in FIG. 12A, is employed and no train of drive pulses in the second basic pattern P2, shown in FIG. 12B, is employed. Under such a condition, two switching frequencies fl1, fl2, occurring at the trailing edges with a duty cycle of "X %", match each other. To address such a result, with the present embodiment, the memory 32 of the microcomputer (switching device) 30, shown in FIG. 2, is arranged to store a train of drive pulses D10, D11 for a control cycle time TC equaling to a value of two time period Ta1, Ta2 (2×Ta) in first and second basic patterns each of which includes leading time intervals Th1, Th2 under which the drive pulses are arranged to have duty cycles to provide an average required duty of "X %". In particular, a first train of drive pulses D10, D11 for the time period Ta1 in the first basic pattern is arranged to have an average duty of "(X+α) %" and a second train of drive pulses D10, D11 for the time period Ta2 in the second basic pattern is arranged to have an average duty of "(X−α) %". With such arrangement, the first and second trains of drive pulses D10, D11 can have an average duty of "X %" for the control cycle time TC.

With the present embodiment, further, if the first and second trains of drive pulses D10, D11 do not have the required duty of "X %" for the control cycle period TC, the both trains of drive pulses D10, D11 may have a duty common to each other for the time periods Ta1, Ta2 in the first and second basic patterns. However, for the purpose of avoiding duty control from being discontinuously shifted when the required duty is "X %", the first and second trains of drive pulses for the time periods Ta1, Ta2 within the control cycle time TC may be arranged to have duties different from each other even when the required duty is out of "X %". That is, if the required duty is "DT", then, the first and second trains of drive pulses for the time periods Ta1, Ta2 are arranged such that the first train of drive pulses for the time period Ta1 in the first basic pattern has a duty expressed as "DT+α{1−|DT−X|/100}" and the second train of drive pulses for the time period Ta2 in the second basic pattern has a duty expressed as "DT−α{1−|DT−X|/100}".

The present embodiment, set forth above, provides, in addition to the advantageous effects (1) and (2) mentioned above, a further advantageous effect as described below.

(4) The first and second trains of drive pulses for the time periods Ta1, Ta2 in the first and second basic pattern are arranged to have the duties different from each other under conditions where the first and second trains of drive pulses for the control cycle time TC have the average duty falling in the required duty. With such arrangement, the drive pulses can be avoided from having the duty (of "X %" in the above example) that would cause the switching frequencies to overlap each other. Also, with the trains of drive pulses for the control cycle time TC arranged to have the average duty falling in the required duty, the trains of drive pulses for the control cycle time TC can be set to have the required duty while appropriately avoiding the switching frequencies from overlapping each other.

Third Embodiment

Now, a third embodiment is described below with reference to the accompanying drawings with a focus on a difference with respect to the first embodiment.

With the present embodiment, variable duty control is performed in a way to cause a train of drive pulses to have a duty under which not only the switching frequencies are avoided from overlapping each other but also plural harmonics of the switching frequencies are avoided from overlapping each other in a frequency band of an AM radio broadcast.

As used herein, the term "overlapping" refers to a status wherein a frequency difference among a plurality of harmonics falls in a bandwidth for every broadcast station of an AM radio in an AM broadcast frequency band for which the witching device needs to take a measure for suppression of noise. That is, in case of, for instance, an AM radio broadcast in Japan, since each broadcast station has a bandwidth of "9 kHz", the presence of a frequency difference between harmonics remaining in a range of "9 kHz" refers to be "overlapping".

Figures 15, 16:
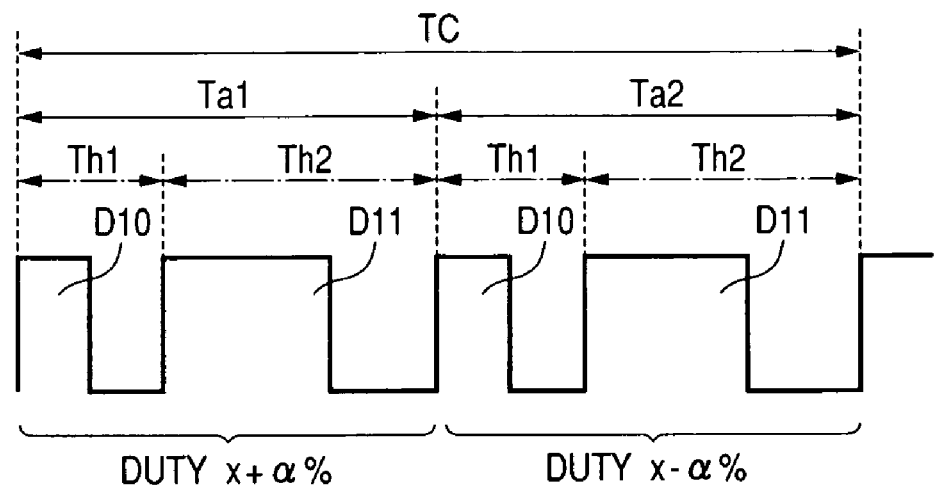
FIG. 15 is a waveform diagram of a train of drive pulses for performing duty control in a second embodiment according to the present invention.
FIG. 16 is a map showing the relationship between duty of the train of drive pulses and the occurrence of switching frequencies overlapping each other in a third embodiment according to the present invention.

More particularly, with the present embodiment, the memory 32 of the microcomputer 30 stores a map including an N-number of patterns as basic patterns as shown in FIG. 16.

The map, shown in FIG. 16, represents the relationship among variation in duty (%) and various basic patterns for illustrating conditions under which some of harmonics of the switching frequencies, determined by the respective basic patterns, and some of harmonics of the switching frequencies, resulting from the trailing time intervals associate with the trailing edges of the drive pulses with a given duty appearing when duty control is performed, do not overlap each other in a frequency band of an AM radio broadcast.

Here, any of circles in a solid line and a broken line represents a duty under which no overlapping takes place between harmonics of switching frequencies. However, only the duty indicated by the circle in the solid line is used for a train of drive pulses in actual practice. This is because the microcomputer 30 is configured to make unambiguous determination as to which of the basic patterns is selected from among plural basic patterns arranged to provide duties by which plural harmonics of switching frequencies do not overlap each other in a frequency band of an AM radio broadcast. In setting the basic pattern for the train of drive pulses, the microcomputer 30 is arranged so as to preclude the basic patterns from being frequently shifted upon selecting the same basic pattern as that available to have an adjacent duty even when the other basic pattern is available. That is, with a "2%" duty, the basic pattern 1 and the basic pattern N can be used. But, with a "1%" duty, the basic pattern 1 is already selected and, therefore, the basic pattern 1 is also selected for the "2%" duty.

With the present embodiment set forth above, the switching device has, in addition to the advantages effects described above, a further advantageous effect as described below.

(5) With the switching device arranged to perform variable duty control, the trains of drive pulses have the duty in which plural harmonics of the switching frequencies do not overlap each other, avoiding an increase in energy level of noise due to a frequency of harmonics resulting from the occurrence of overlapped harmonics.

Fourth Embodiment

Now, a fourth embodiment is described with reference to the accompanying drawings with a focus on a differing point with respect to the first embodiment.

With the present embodiment, the memory 32 of the microcomputer 30 is configured to store a train of drive pulses, determined in a basic pattern, for a repetition cycle time having leading time intervals associated with leading edges that are shifted from the beginnings of the leading time intervals by a minute degree.

That is, the train of drive pulses D15, D16 defined in the basic pattern, as shown in FIG. 17A, and composed of the two leading time intervals Th1, Th2 associated with leading edges a15, a16, respectively, and the leading edges a15, 1a6, a15 of the drive pulses D15, D16, D15 are shifted by respective minimal shift amounts φ0 to φ2 as indicated by a waveform shown in FIG. 17B. Thus, the switching power transistor 26 is operated in response to the train of drive pulses D15, D16 defined in the basic pattern with the leading edges shifted by respective shift amounts φ0 to φ2 as shown in FIG. 17B. The number of plural shift amounts for the leading edges of the drive pulses to be shifted is set to differ from the number of drive pulses defined in the basic pattern.

Incidentally, the shift amount may be preferably set to be greater than a cycle (greater than one quarter of a ringing period) of ringing with surge and fall in a value approximately equivalent to several periods of the ringing cycle.

With the present embodiment set forth above, the switching device has, in addition to the advantageous effects described above, a further advantageous effect as described below.

(6) With the train of drive pulses generated in the basic pattern composed of the leading time intervals associated with the leading edges shifted by respective minimal shift amounts with respect to the beginnings of the time intervals, an energy level of surge can be diffused in a further extent.

OTHER EMBODIMENTS

Also, the various embodiments mentioned above may be modified in a manner as described below.

While the second embodiment has been described above with reference to an example wherein the control repetition cycle time TC is set to a value twice the period Ta of the basic pattern, the present invention is not limited to such a value. Further, although the mode of variable duty control has been described in connection with the pattern in which the average duty is made equal to the required duty under conditions where the trains of drive pulses for the first and second time periods Ta1, Ta2 have duties different from each other, the present invention is not limited to such a mode. For instance, the switching device may be altered such that the drive pulse D10 for the time interval Th1 of the first time period Ta1 and the drive pulse D11 for the time interval Th2 of the second time period Ta2 have respective duties each set to a value of "(X+α) %" and the drive pulse D11 for the time interval Th2 of the first time period Ta1 and the drive pulse D10 for the time interval Th1 of the second time period Ta2 have respective duties each set to a value of "(X−α) %".

Although various embodiments and modified forms have been described with reference to the mode of duty control in which the train of drive pulses for the repetition cycle time having the leading time intervals associated with the leading edges and trailing time intervals associated with the trailing edges in the basic pattern under the condition where the switching frequencies do not overlap each other, the present invention is not limited to such mode of duty control. For instance, an alternative may be made such that the microcomputer 30 stores information related to the basic pattern shown in FIG. 12A and information related to only the area 1b shown in FIG. 12C to allow duty control to be performed with only the duty of the area 1b.

With the various embodiments set forth above, while the leading time intervals, associated with the leading edges of drive pulses, have been determined using the basic pattern, the trailing time intervals, associated with the trailing edges of the drive pulses, may be determined. Also, another alternative may be arranged such that logic "H" level of the drive pulse is correlated to the turn-off operation of the switching power transistor 26 and logic "L" level of the drive pulse is correlated to the turn-off operation of the switching power transistor 26.

With the various embodiments, the frequency band, for which a device (switching device) needs to take a measure for noise suppression, is set to a whole range of the frequency band (such as a whole area of an AM frequency band ranging from "510 to 1710 kHz") of the radio broadcast for an object to be targeted. With the frequency band set in such a range, noise suppression can be achieved using the same switching control even when a user receives any AM radio broadcast. However, the frequency band for which the measure needs to be undertaken for noise suppression may not be limited to such a whole area of the frequency band of the radio broadcast that is targeted. For instance, of the frequency band ranging from "510 to 1000 kHz" and the frequency band ranging from "1000 to 1710 kHz" in the AM frequency band, a frequency band selected by the user may be targeted as an object for which the measure needs to be undertaken for noise suppression. Then, if the mode of switching control is altered depending on whether or not any of these two frequency bands includes a radio station selected by the user, the train of drive pulses may be generated in a pattern to avoid the switching frequencies and associated harmonics from overlapping each other in various frequency bands. That is, when performing switching control in an LW band or the like at a frequency lower than that of, for instance, the AM frequency band, it is hard to make the setting so as to prevent the harmonics from overlapping each other within a whole area of the AM frequency band. Therefore, by variably setting the modes (the basic pattern and the pattern in which duty control is performed) of switching control, the train of drive pulses may be generated upon easily setting various patterns in a way to preclude harmonics from overlapping each other.

The basic pattern and duty control for switching control may be performed in modes to prevent the switching frequencies and associated harmonics from overlapping carrier waves of various radio broadcast stations. Moreover, for a vehicle on which a location detection device such as GPS or the like is installed, a frequency of an available broadcast station is detected depending on a detected location of the vehicle delivered from a location detecting device and the mode of switching control is variably set to prevent the switching frequencies and associated harmonics from overlapping the frequency of the broadcast station. Even with such setting being made, probabilities may occur wherein the switching frequencies and associated harmonics overlap the carrier waves of the radio broadcast stations available to be received and, therefore, it is quite effective for the diffused frequencies to be selected in a value higher than an audible frequency range.

While the switching device needs to take a measure for noise suppression for frequency signals, the present invention is not limited to the frequency signals transmitted from radio broadcast stations. For instance, after shipment of a vehicle, the vehicle may be installed with an audio playback apparatus, such as an audio CD (Compact Disc) playback device and an MD (Mini Disc) playback device, and a DVD (Digital Versatile Disc) playback device or the like. These playback devices include a device in which acoustic information, contained in medium playing a role as an object to be reproduced, is outputted as a frequency signal that can be received by the radio receiver 18. With such a device, acoustic information, contained in medium serving as the object to be reproduced, is transmitted as a frequency signal involved in a frequency band of a radio, upon which the radio receiver 18 demodulates acoustic information to be outputted by the speaker 19. However, even under such a situation, there is a fear for the switching frequencies and the associated harmonics to overlap the frequency utilized by the playback device, causing the speaker 19 to output audible noise. To address such an issue, the application of the present invention is effective for such a frequency signal. Incidentally, even under such a situation, it is quite effective to make the setting in a manner as set forth above so as to avoid the plural switching frequencies and associated harmonics from being involved in a bandwidth for each broadcast station of the radio proximate to the frequency utilized by the playback device mentioned above. Therefore, even under circumstances where noise suppression is needed only for the frequency signal transmitted from, for instance, the playback device mentioned above, noise suppression may be undertaken in the same manner as those of the various embodiments set forth above to eliminate noise in a whole area of a frequency band (such as a whole area of the frequency band of, for instance, an AM broadcast) of the radio utilized by the playback device.

While the present invention has been described above with reference to various embodiments wherein the leading time intervals, associated with the leading edges of the drive pulses, are set in the pattern wherein for the purpose of preventing the switching frequencies and associated harmonics from discontinuously overlapping a given frequency for which a measure needs to be undertaken for suppression of noise, the inverse number of the repetition cycle time is arranged not fall in the audible frequency band, the present invention is not limited to such a pattern in which the diffused frequencies are higher than the audible frequency. For instance, even with the mode typically shown in FIG. 18, the inverse number of the repetition cycle time, in which the switching frequencies and associated harmonics under the basic pattern overlap the given frequency, may be arranged not to fall in the audible frequency band. FIG. 18 exemplarily shows a case wherein noise suppression is undertaken for a broadcast frequency band (ranging from "30 to 300 kHz") of a long wave (LW) band. In FIG. 18, the switching frequencies, appearing under the basic pattern, includes four frequencies of "50 kHz", "47 kHz", "60 kHz" and "53 kHz". Thus, a diffusion frequency lies in a value of approximately "13 kHz" that falls in an audible frequency band. However, suppose the given frequency mentioned above lies in a value of "300 kHz", the switching frequencies whose harmonics overlap the given frequency include two frequencies of "50 kHz" and "60 kHz" and, hence, the inverse number of the repetition cycle time in which the harmonics overlap the given frequency mentioned above lies in a frequency of approximately "24 kHz" that exceeds the audible frequency. Of course, in this example, a probability occurs for noise, caused by the switching frequencies and associated harmonics, to be reproduced in an audible range when receiving a frequency except for "300 kHz".

Also, in FIG. 18, a sixth harmonic of the switching frequency "50 kHz" overlaps a fifth harmonic of the switching frequency "60 kHz" and this represents an exemplary case in which the numbers of orders of the harmonics, which overlap the given frequency, are proximate to each other. On the contrary, like a case in which, for instance, a fifth harmonic and twentieth harmonic overlap the given frequency set forth above, a case is conceived in that the numbers of orders of the harmonics are widely separated from each other and the inverse number of a period between one overlapping state and a subsequent overlapping state in which harmonics overlap the given frequency exceeds the audible frequency. However, under such a situation, the twentieth harmonic, which overlaps the given frequency mentioned above, has an extremely small energy level. Therefore, depending on a period between one overlapping state and the subsequent overlapping state in which the fifth harmonic substantially overlaps the given frequency, determination may be made whether or not a speaker outputs noise in an audible range. Therefore, under such a situation, the diffusion frequency may be selected to be higher than the audible frequency.

Incidentally, in FIG. 18, under a situation where the switching frequencies, determined by the basic pattern, takes a sequence of "50 kHz", "47 kHz", "60 kHz" and "53 kHz" in this order, the inverse number of the period, in which harmonics of these switching frequencies overlap the given frequency, nearly lies in a frequency of "13 kHz" that falls in the audible frequency.

Additionally, let's consider a case as shown in FIG. 19A. In FIG. 19A, a train of drive pulses D20 to D22 for a repetition cycle time TE is shown having a leading time intervals Th1 to Th3 associated with leading edges a20 to a22 of the drive pulses D20 to D22 in a basic pattern. With such a train of drive pulses, switching frequencies fh1 to fh3, appearing during these leading time intervals Th1 to Th3, include harmonic components as shown in FIG. 19B. As shown in FIG. 19C, even if a harmonic in an Nth order of the switching frequency fh3 overlaps a harmonic in an order of "N+1" of the switching frequency fh1, it is hard to expect the phenomenon exemplified in FIG. 18. Therefore, even with such a case, the diffusion frequency may be preferably set to a frequency higher than an audible frequency.

Additionally, under circumstances where with the diffusion being set to a value less than the audible frequency (such as, for instance, "20 kHz"), the switching frequencies and associated harmonics intermittently overlap a given frequency, the inverse number of the period between one overlapping state and a subsequent overlapping state may be set to a value that does not fall in the audible frequency band. However, when this takes place, if the switching frequencies and associated plural harmonics overlap the given frequency described above, probabilities occur for the inverse number of the period between one overlapping state and the subsequent overlapping state to fall in the audible frequency band. Therefore, the diffusion frequency may be preferably set to be less than a value expressed as the audible frequency (of, for instance, "20 kHz")/(number of overlapping).

Figure 20:
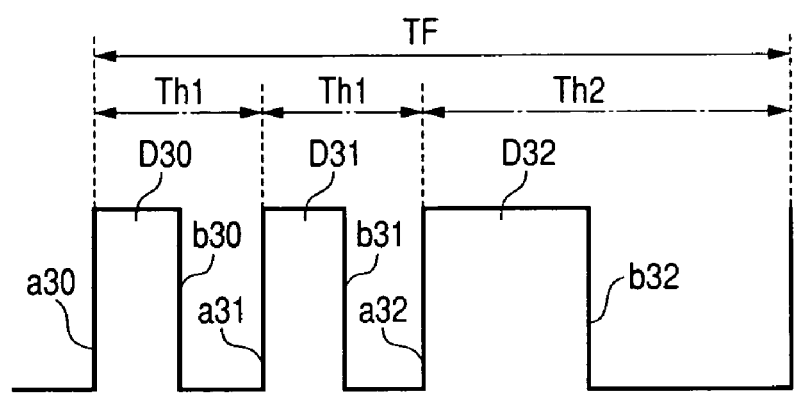
FIG. 20 is a waveform diagram of a train of drive pulses in a modified form of the various embodiments according to the present invention.
Figure 21:
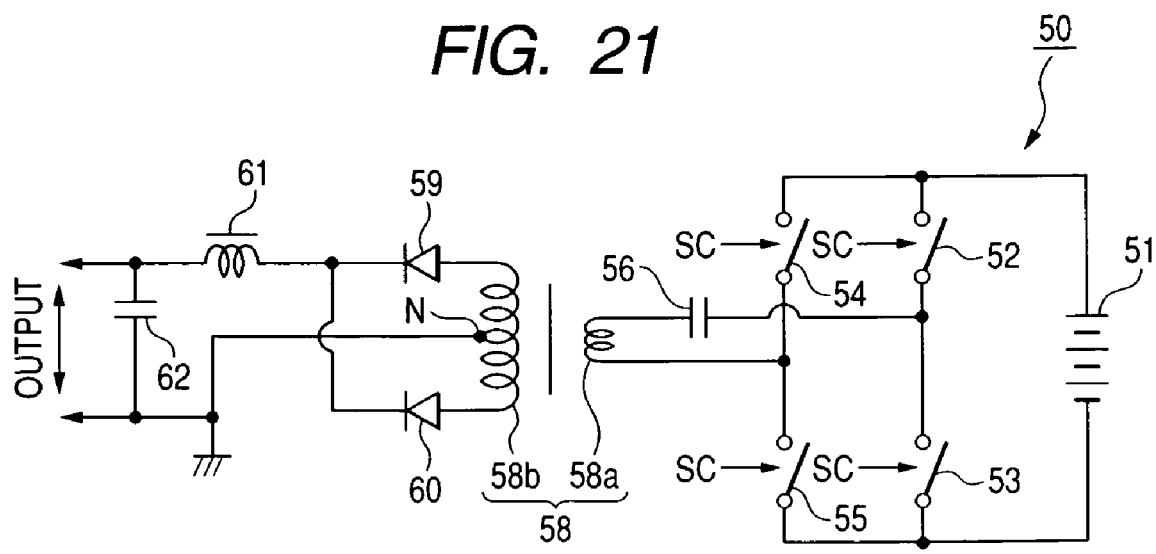
FIG. 21 is a circuit diagram showing another example of the DC-DC converter shown in FIG. 2.

While the various embodiments have been described above with reference to examples wherein all of the leading time intervals associated with the leading edges of the drive pulses are made different from each other, an alternative may be possible such that some of the leading time intervals equal to each other like a basic pattern shown in FIG. 20. With a waveform shown in FIG. 20, a train of drive pulses D30 to D32 for a repetition cycle time TF is shown having a leading time intervals Th1, Th1, Th3 associated with leading edges a30 to a32 of the drive pulses D30 to D32 in the basic pattern. Even with such a waveform of the train of drive pulses, if a diffusion frequency of 1/TF is set to be higher than the audible frequency, a switching frequency, appearing during the time interval Th2, is supposed to occur at a frequency of "600 kHz" and, in this case, output noise, to be reproduced by the speaker 19 when receiving a broadcast station with a frequency of "600 kHz", may be set to a value higher than the audible frequency.

While the various embodiments and related modifications have been described above with reference to the various basic patterns for the train of drive pulses, the present invention is not limited to such basic patterns. For instance, frequency noise, resulting from switching control, may be diffused in a further extent provided that the diffusion frequencies or associated harmonics do not overlap the switching frequencies, determined by the basic pattern, and the associated harmonics at a frequency band for which the switching device needs to undertake a measure for noise suppression.

While the various embodiments have been described above with reference to an exemplary case wherein the control object is controlled to a desired control quantity under duty control, the present invention is not limited to such duty control mentioned above. The point is that even if the switching frequencies, determined by switching control mentioned above, and associated harmonics overlap the given frequency for which the switching device needs to undertake a measure for noise suppression, the basic pattern for the train of drive pulses may be arranged to allow the switching frequencies and associated harmonics to overlap the given frequency merely in a discontinuous fashion. Also, the inverse number of the repetition cycle time is set to a value that does not fall in the audible frequency band, making it possible to cause the speaker to output noise in a range outside the audible range.

While the various embodiments have been described above with reference to the switching device configured to turn the switching power transistor on and off in response to the train of drive pulses determined under the basic pattern by which the inverse number of the repetition cycle time does not fall in the audible frequency band when the switching frequencies and associated harmonics discontinuously overlap the given frequency for which the switching device needs to take a measure for noise suppression, the present invention is not limited to such a switching device wherein the turn-on and turn-off operations are repeatedly in response to the drive pulses determined under the basic pattern. For instance, by permitting some of predetermined switching frequencies to be correlated to given numbers so as to allow the given numbers to correspond to numbers generated by a random number generator, these numbers may be used to select switching frequencies for the switching power transistor 26 to be turned on and off. Even under such a situation, it becomes possible to obtain an advantageous effect based on the advantageous effect (1) mentioned above with reference to the first embodiment provided that (a) operations are performed to execute operation of discriminating whether or not a selected frequency and associated harmonics overlap a given frequency, for which the switching device needs to undertake for noise suppression, whenever a new switching frequency is selected depending on the number generated by the random number generator; (b) under circumstances where the selected frequency and associated harmonics overlap the given frequency, operation is executed to calculate the inverse number of the period between a preceding overlapping state and a subsequent overlapping state; and (c) under circumstances where the inverse number resulting from the above calculation falls in an audible frequency band, the random number generator is caused to generate a number again without operating the switching power transistor 26 with the selected switching frequency.

While the switching device has been described above with reference to the DC-DC converter 20, shown in FIG. 2, which is configured to execute switching control to cause the switching power transistor to be repeatedly turned on and off, the present invention is not limited to such a DC-DC converter 20. For instance, the DC-DC converter 20 may be replaced by a DC-DC converter 50 of an insulation type shown in FIG. 20. With the DC-DC converter 50, a series connected circuit of switching power transistors 52, 53 and another series connected circuit of switching power transistors 54, 55 are connected to a high voltage battery 51 in parallel to each other. A junction point between the switching power transistors 52, 53 and a junction point between the switching power transistors 54, 55 are connected to each other through a capacitor 56 and a coil 58a of a transformer 58. In the meanwhile, the transformer 58 has a coil 58b whose both ends are connected to diodes 59, 60, respectively. The diodes 59, 60 have cathodes connected to one end of a coil 61. Additionally, the other end of the coil 61 is connected to one terminal of a capacitor 62. Moreover, a node N of the coil 58b of the transformer 58 and the other terminal of the capacitor 62 are connected to ground. Incidentally, the DC-DC converter 50 outputs a voltage across the both terminals of the capacitor 62.

Figure 22A:
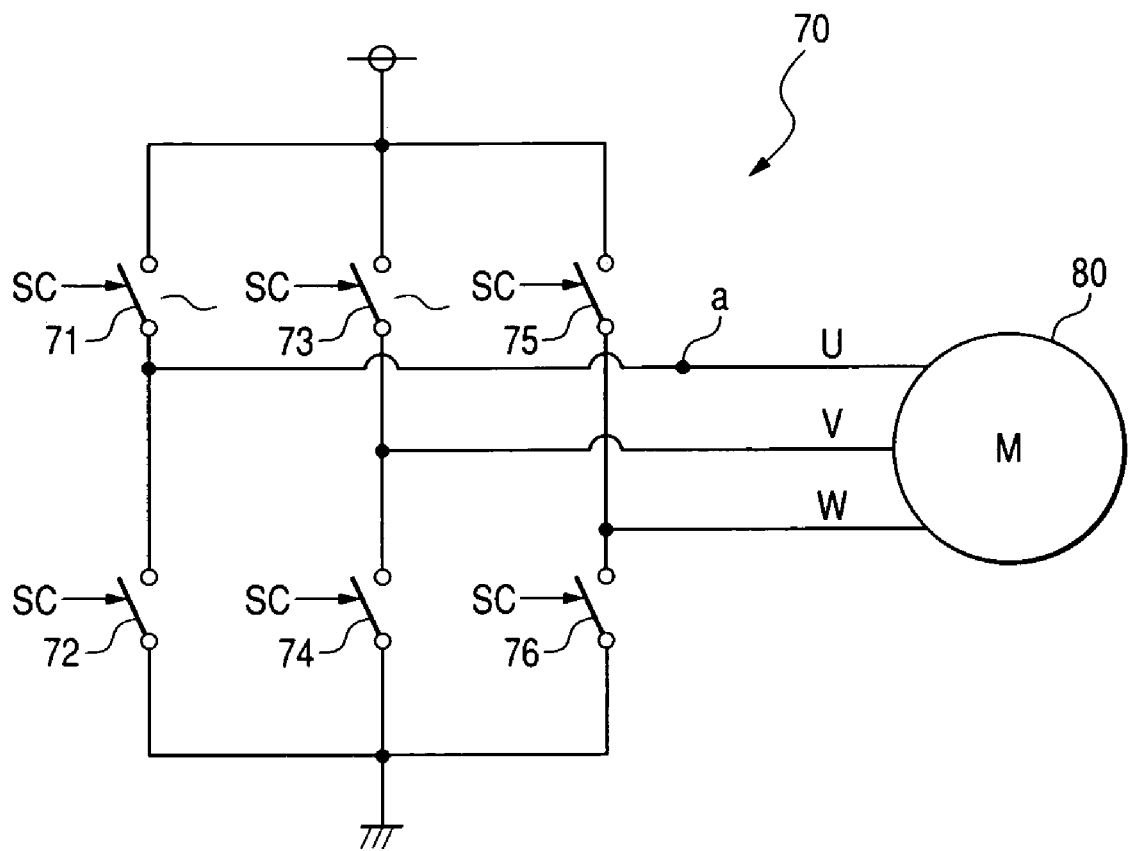
FIG. 22A is a circuit diagram of an inverter including switching power elements to which the switching device and an operation method of the present invention can be applied.
Figure 22B:
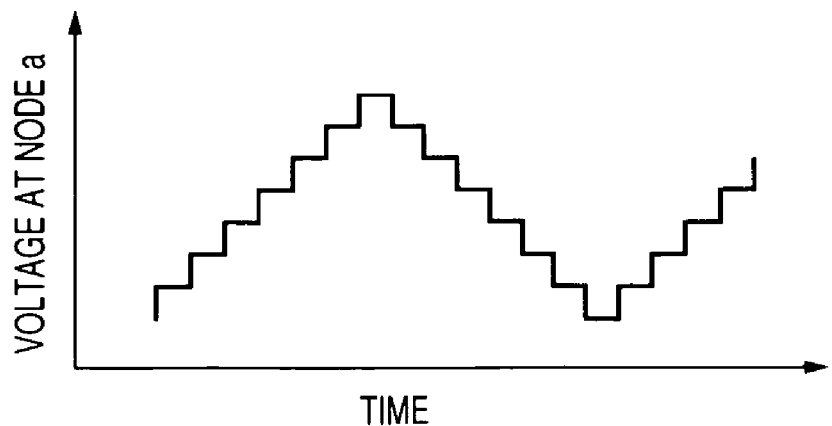
FIG. 22B is a view showing a waveform of a voltage output generated by the inverter shown in FIG. 22A.

Further, the present invention may utilize not only the DC-DC converter mentioned above but also an inverter 70 exemplarily shown in FIG. 22A. In FIG. 22A, there is shown an example wherein the inverter 70 is connected to a power steering motor 80. The inverter 70 is of the type in which a series connection of switching power transistors 71, 72 and the other series connection of switching power transistors 75, 76 are connected in parallel between a power supply and ground. Of the series connections mentioned above, an output of the inverter is extracted from a junction point between two witching power transistors (such as a junction point between the switching power transistors 71, 72). Incidentally, the inverter 70 is operated in switching control, providing a node a with an output voltage fluctuating in a manner as shown in FIG. 22B.

The switching frequencies, to be considered for the basic pattern of the train of drive pulses with a view to suppressing noise, may include not only frequency bands such as those of an AM radio and LM band but also a frequency band of an FM broadcast. Thus, in performing switching control at such a high frequency, an issue arises in the number of overlapping frequency in which the switching frequencies and associated harmonics overlap the frequency of the FM frequency band.

In addition, the switching device may not be limited to that installed on a vehicle such as a hybrid vehicle. However, in a case where the switching device is installed on the vehicle, the present invention is particularly effective to be applied to the vehicle for addressing the fear of noise mixed to a car audio device or the like.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A switching device for repeatedly turning a switching power element on and off, comprising:
   a memory storing a basic pattern; and
   a drive pulse generator configured to generate a train of drive pulses under the basic pattern, stored in the memory, for a repetition cycle time having leading time intervals, associated with leading edges of the drive pulses, and trailing time intervals associated with trailing edges of the drive pulses, with at least one of the leading time intervals and the trailing time intervals being different from each other;
   wherein an inverse number of the repetition cycle time is kept away from an audible band under a condition where switching frequencies, resulting from at least one of the leading time intervals and the trailing time intervals, and associated harmonics intermittently overlap a given frequency for which the switching device needs to undertake a measure for noise suppression.

2. The switching device according to claim 1, wherein:
   the drive pulse generator comprises frequency diffuser means arranged to store the basic pattern, under which the repetition cycle time has the leading time intervals and the trailing time intervals that are different from each other, such that switching frequencies, resulting from the leading time intervals and the trailing time intervals, and associated harmonics are diffused; and
   wherein a diffusion frequency, representing a repetition cycle of the basic pattern, is set to be higher than the audible frequency band.

3. The switching device according to claim 2, wherein:
   the basic pattern is set such that at least one of the leading time intervals and the trailing time intervals are entirely different from each other.

4. The switching device according to claim 3, wherein:
   the basic pattern is set such that the associated harmonics of the switching frequencies do not overlap each other in a frequency band for which the switching device needs to undertake a measure for noise suppression.

5. The switching device according to claim 2, wherein:
   the memory stores the basic pattern composed of a plurality of patterns under which the leading time intervals and the trailing time intervals are different from each other; and
   the drive pulse generator comprises duty control means operative to perform duty control upon selecting one of the plurality of patterns to allow the drive pulses to have duty cycles, respectively, under which the switching frequencies, resulting from the leading time intervals and the trailing time intervals, do not overlap each other in the audible frequency band.

6. The switching device according to claim 5, wherein:
   the memory stores the duty cycles of the drive pulses, respectively, with which the switching frequencies, resulting from the leading time intervals and the trailing time intervals, and associated harmonics do not overlap each other, and the duty control means being operative to perform the duty control using the duty cycles stored in the memory.

7. The switching device according to claim 5, wherein:
   the memory stores the basic pattern including a plurality of patterns such that the drive pulses in one of the plural patterns and the drive pulses in the other one of the plural patterns have different duties, and the duty control means selects one of the plurality of patterns depending on a required duty.

8. The switching device according to claim 7, wherein:
   the duty control means performs the duty control so as to provide an average duty satisfying a required duty for the repetition cycle time upon selecting the different duties.

9. The switching device according to claim 5, wherein:
   the duty control means performs the duty control such that the associated harmonics of the switching frequencies, resulting from the leading time intervals and the trailing time intervals of the drive pulses, do not overlap each other in a frequency band for which the switching device needs to undertake a measure for noise suppression.

10. The switching device according to claim 1, wherein:
the given frequency includes a frequency falling in a frequency band of a radio broadcast and an expression "to overlap the given frequency" refers to a status wherein a frequency difference with respect to the given frequency falls in a bandwidth for one broadcast station of the radio broadcast.

11. The switching device according to claim 1, wherein:
the given frequency, for which the switching device needs to undertake the measure for noise suppression, includes a frequency band of a radio broadcast and an expression "to overlap the given frequency" refers to a status wherein a frequency difference with respect to the given frequency falls in a bandwidth for one broadcast station of the radio broadcast.

12. The switching device according to claim 1, wherein:
the frequency diffuser means is operative to shift the leading time intervals of the drive pulses by given shift amounts, respectively.

13. A method of operating a switching power element, the method comprising:
preparing a switching power element; and
applying the switching power element with a train of drive pulses in a basic pattern for a repetition cycle time having leading time intervals, associated with leading edges of the drive pulses, and trailing time intervals associated with trailing edges of the drive pulses, with the leading time intervals and the trailing time intervals being different from each other;
wherein an inverse number of the repetition cycle time is kept away from an audible band whereby switching frequencies, resulting from the leading time intervals and the trailing time intervals, and associated harmonics do not overlap a given frequency at which noise suppression is needed.

14. The method of operating the switching power element according to claim 13, wherein:
the leading time intervals and the trailing time intervals are determined in a leading time interval pattern and a trailing time interval pattern, respectively, such that switching frequencies, resulting from the leading time intervals and the trailing time intervals, and associated harmonics are diffused.

15. The method of operating the switching power element according to claim 13, wherein:
the leading time interval pattern and the trailing time interval pattern are set such that the switching frequencies and associated harmonics do not overlap each other in a frequency band for which noise suppression is needed.

16. The method of operating the switching power element according to claim 13, wherein:
the leading time intervals and the trailing time intervals are different from each other in the leading time interval pattern and the trailing time interval pattern so as to allow the drive pulses to have given duty cycles, respectively, by which the switching frequencies and associated harmonics do not overlap each other in an audible frequency band.

17. The method of operating the switching power element according to claim 13, wherein:
the repetition cycle time comprises a control cycle time including first and second time periods having the leading time intervals in the leading time interval pattern and the trailing time intervals in the trailing time interval patterns; and
wherein the first and second time periods allow the drive pulses to have given duty cycles, respectively, which are different from each other.

18. The method of operating the switching power element according to claim 13, wherein:
the first and second time periods allow the drive pulses to have an average duty in conformity to a required duty.

19. The method of operating the switching power element according to claim 13, wherein:
the leading edges of the drive pulses are shifted from beginnings of the leading time intervals by given shift amounts, respectively, such that the switching frequencies and associated harmonics do not overlap each other in a given frequency band.

* * * * *